United States Patent
Mizuguchi et al.

(10) Patent No.: US 6,320,871 B1
(45) Date of Patent: *Nov. 20, 2001

(54) COMMUNICATION NETWORK

(75) Inventors: Yuji Mizuguchi, Kyoto; Takahisa Sakai, Amagasaki; Toshihisa Ikeda, Kyoto; Toshihiko Kurosaki, Kobe; Kenichi Moriguchi; Toshio Oga, both of Neyagawa, all of (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/012,822

(22) Filed: Jan. 23, 1998

(30) Foreign Application Priority Data

| Jan. 24, 1997 | (JP) | 9-010864 |
|---|---|---|
| Apr. 16, 1997 | (JP) | 9-098779 |
| Sep. 25, 1997 | (JP) | 9-259612 |

(51) Int. Cl.[7] .................................................. H04L 12/423

(52) U.S. Cl. ....................................... 370/452; 370/503

(58) Field of Search .................................. 370/390, 432, 370/455, 452, 453, 400, 410, 522, 444, 503; 340/825.5, 825.52

(56) References Cited

U.S. PATENT DOCUMENTS

| 4,536,874 | * | 8/1985 | Stoffel | 370/453 |
|---|---|---|---|---|
| 5,204,669 | * | 4/1993 | Dorfe | 340/825.52 |
| 5,341,374 | * | 8/1994 | Lewen | 370/450 |
| 5,694,555 | * | 12/1997 | Morriss | 710/100 |
| 5,745,494 | * | 4/1998 | Tatsuta | 370/452 |
| 6,005,869 | * | 12/1999 | Sakai | 370/452 |
| 6,032,185 | * | 2/2000 | Asano | 709/227 |

FOREIGN PATENT DOCUMENTS

| 4-88737 | 3/1992 | (JP) . |
|---|---|---|
| 9-289518 | 11/1997 | (JP) . |

OTHER PUBLICATIONS

Orphanos, "An Integrated Application/Service Platform to Support Multimedia Applications," IEEE 1994, pp. 1722–1726, Dec. 1994.*

* cited by examiner

*Primary Examiner*—Edwin C. Holloway, III
(74) *Attorney, Agent, or Firm*—Wenderoth, Lind & Ponack L.L.P.

(57) ABSTRACT

A master station $1_1$ produces a token packet for isochronous data in which a slave station $1_2$ and slave stations $1_3$ and $1_4$ serving as a sending station and receiving stations are designated using IDs for isochronous data "#2" and "#3" in accordance with contents described in a table $16_1$ held in its inner part so as to manage a transmission bandwidth using a token packet sending/analysis executing device 16, and sends out the produced token packet to a transition path 15 on the downstream side. The slave station $1_2$ sends out an isochronous data packet 42 using the token packet for isochronous data 41. According to the token packet for isochronous data 41, the slave stations $1_3$ and $1_4$ are designated as receiving stations using the ID for isochronous data "#3", so that the slave stations $1_3$ and $1_4$ perform the above-mentioned operations, to receive the isochronous data packet 42. The sending station can thus transmit the same isochronous data to a plurality of receiving stations belonging to a broadcast group, so that it is possible to establish multicast communication (communication to a plurality of nodes).

20 Claims, 29 Drawing Sheets

FIG. 5

| | MASTER STATION 11 | SLAVE STATION 12 | SLAVE STATION 13 | SLAVE STATION 14 |
|---|---|---|---|---|
| ACTUAL ID | #a | #b | #c | #d |
| ID FOR ISOCHRONOUS DATA | #1 | #2 | #3 | #3 |

COMMUNICATION NETWORK

CROSS REFERENCE TO RELATED APPLICATION

The present application is related to U.S. patent application Ser. No. 08/843,597 filed on Apr. 16, 1997 (now U.S. Pat. No. 6,005,869) assigned to the same assignee of the present application.

BACKGROUND OF THE INVENTION

1. Field of the Invention

The present invention relates to a communication network, and more particularly, to a communication network capable of establishing asynchronous data communication not requiring real time properties and isochronous data communication requiring the real time properties.

2. Description of the Background Art

Examples of a conventional loop communication network include one disclosed in "JP-A-9-289518". FIG. 29 is a block diagram showing the structure of the loop communication network. In FIG. 29, a plurality of stations (four stations $29_1$ to $29_4$ are illustrated) are connected so as to be capable of communicating with each other by a loop-shaped transmission path 295. Identifiers which are not overlapped with each other (hereinafter referred to as actual IDs) are fixedly assigned to the stations $29_1$ to $29_4$, respectively. The station $29_1$ of the four stations $29_1$ to $29_4$ functions as a master station, and the other stations $29_2$ to $29_4$ function as slave stations (which may, in some cases, be hereinafter referred to as the master station $29_1$ and the slave stations $29_2$ to $29_4$).

The procedure for communication in the communication network will be described.

The master station $29_1$ holds a table 296 for managing a transmission bandwidth. The master station $29_1$ generates a token packet in which a station to be a source of transmission data (hereinafter referred to as a sending station) and a station to be a destination of transmission of the data (hereinafter referred to as a receiving station) are designated using actual IDs (hereinafter referred to as a sending station ID and a receiving station ID) in accordance with contents described in the table 296, and sends out the token packet to the transmission path 295. It is assumed that the station $29_4$ and the station $29_3$ are designated as the sending station and the receiving station, respectively. The token place returns to the master station $29_1$ upon circulating around the loop-shaped transmission path 295. The master station $29_1$ deletes the returned token packet. When the token packet circulating around the transmission path 295 arrives, each of the slave stations $29_2$ to $29_4$ branches the token packet into two token packets, to receive one branched token packet, while sending out the other branched token packet to the transmission path 295 on the downstream side. Each of the slave stations $29_2$ to $29_4$ judges whether or not the sending station ID or the receiving station ID of the accepted token packet identifies with the actual ID of the slave station. The slave station $29_4$ judges that data transmission is enabled because the sending station ID and the actual ID of the slave station identify with each other. Further, the slave station $29_3$ judges that data receiving is enabled because the receiving station ID and the actual ID of the slave station identify with each other.

The slave station $29_4$ sends out, when it holds a data packet to be transmitted immediately after judging that data transmission is enabled, the data packet to the transmission path 295. The data packet is transmitted so as to succeed the token packet when it is sent out to the loop-shaped transmission path 295, and returns to the sending station (the slave station $29_4$) upon circulating around the transmission path 295. The slave station $29_4$ deletes the returned data packet.

The master station $29_1$ controls a switch (not shown) when the token packet and the data packet arrive from the transmission path 295 on the upstream side, to send out only the data packet of the two types of arrived packets to the transmission path 295 on the downstream side. FIG. 29 illustrates the data packet immediately after the master station $29_1$ controls the switch.

The slave station $29_3$ receives, when it judges that data receiving is enabled, the data packet arriving within a predetermined time period elapsed since it received the token packet.

In the communication network, point to point communication can be established between the sending station and the receiving station which are designated by the token packet. Further, the master station $29_1$ sends out the token packet at predetermined time intervals in accordance with contents described in the table 296 for managing the transmission bandwidth in the communication network. When isochronous data is communicated between the sending station and the receiving station, therefore, the real time transfer of the isochronous data is reserved if the transmission bandwidth is ensured on the table 296.

In the communication network shown in FIG. 29, a first method in which the master station $29_1$ sets a plurality of receiving station IDs in the token packet in order to establish communication between one station and a plurality of stations (which is referred to as multicast communication, and broadcast communication particularly in the case of communication between one station and all stations) is considered. Since the token packet generally has a fixed length, the number of receiving station IDs which can be set has a limit. If the number of stations which are accommodated in the communication network is increased, it is possible to anticipate the problem that multicast communication cannot be ensured. Next, a second method in which special IDs for multicast communication are provided in addition to actual IDs is considered. That is, it is assumed that a special ID (for example, #1) is assigned to a combination of the slave stations $29_2$ and $29_3$, for example, in FIG. 29. If the special ID; #1 is set to the receiving station ID of the token packet, therefore, the master station $29_1$ can designate the plurality of stations (the slave stations $29_2$ and $29_3$) as receiving stations. However, an attempt to apply the second method to ensure multicast communication requires the number of special IDs corresponding to combinations of all the stations. If the number of stations accommodated in the communication network is increased, the data length of the IDs is increased. Therefore, it is possible to anticipate a first problem that the special ID cannot, in some cases, be set in the token packet having a fixed length. Further, the master station $29_1$ must manage not only the actual ID but also the special ID, whose management becomes difficult.

In the communication network shown in FIG. 29, the master station $29_1$ sends out the token packet in which the sending station and the receiving station are designated to the transmission path 295. However, the station 29 designated as a sending station by the token packet does not necessarily hold transmission data. That is, each of the stations 29 sends out nothing to the transmission path 295 when it does not hold a data packet to be transmitted immediately after judging that data can be transmitted. As a result, there is a second problem that an unnecessary token packet may be transmitted in the communication network.

In not only the communication network shown in FIG. 29, but also in a general communication network, actual IDs are managed by a network administrator and should not identify the actual ID of the other station 29. In the communication network, however, a new station 29 may be added, and the existing station 29 may be withdrawn. Therefore, there is a third problem in that it is difficult for the network administrator to manage actual IDs. Such a problem has been conventionally pointed out. A method of automatically setting actual IDs is disclosed in "JP-A-4-88737". However, a communication network disclosed in the publication differs from a communication network disclosed in the present application in that it does not consider communication relating to isochronous data.

SUMMARY OF THE INVENTION

Therefore, a first object of the present invention is to provide a communication network capable of ensuring point to point communication and communication between one station and a plurality of stations without significantly increasing the number of IDs respectively assigned to the stations. A second object is to provide a communication network in which an unnecessary token packet need not be sent out. A third object is to provide a communication network capable of automatically setting actual IDs at the time of starting stations in order to simplify the management of the actual IDs.

In order to attain the above-mentioned three objects, the present invention has the following aspects.

A first aspect is directed to a communication network in which a plurality of stations are connected to each other by a loop-shaped transmission path, any one of the plurality of stations functioning as a master station, and asynchronous data communication relating to asynchronous data not requiring real time properties and isochronous data communication relating to isochronous data requiring the real time properties can be established, wherein first identifiers which are used at the time of the asynchronous data communication and are not overlapped with each other are respectively fixedly assigned to the stations, second identifiers which are used at the time of the isochronous data communication and may be overlapped with each other are assigned to the stations as required, the master station sends out to the transmission path for each predetermined time period a token packet for isochronous data in which a station transmitting the isochronous data (hereinafter referred to as a sending station) and a station receiving the isochronous data (hereinafter referred to as a receiving station) are designated using the second identifiers when the isochronous data communication should be established, so that a plurality of stations receiving the isochronous data can be designated, and the sending station transmits, when the token packet for isochronous data is transmitted through the transmission path, the isochronous data to be transmitted to the receiving stations, so that the isochronous data communication is started.

According to the first aspect, the isochronous data communication is started on the basis of the token packet for isochronous data in which the receiving stations are designated using the second identifiers. The second identifiers may be assigned to the stations as required and also be overlapped with each other, so that it is possible to easily ensure multicast communication of the isochronous data.

A second aspect is characterized in that in the first aspect, the second identifiers are assigned to the stations establishing the isochronous data communication by the asynchronous data communication.

According to the second aspect, the second identifiers are set by the asynchronous data communication. Therefore, it becomes easy to add a new station to the stations receiving the same isochronous data (a broadcast group) by the multicast communication and withdraw the station, which has already belonged to the broadcast group, from the group.

A third aspect is characterized in that in the second aspect, when the isochronous data transmitted by the sending station is received by the plurality of receiving stations in the isochronous data communication, only one receiving station of the plurality of receiving stations sends out to the transmission path a response signal for controlling the transmission of the isochronous data by the sending station and/or reporting the acknowledgement of the isochronous data communication by the receiving station.

According to the third aspect, only one receiving station in the broadcast group sends out the response signal to the transmission path. Therefore, no signal collision occurs on the transmission path.

A fourth aspect is characterized in that in the third aspect, only one receiving station is set by the asynchronous data communication.

According to the fourth aspect, only one receiving station is set by the asynchronous data communication. Therefore, it becomes easy to change the different receiving stations in the broadcast group into only one receiving station.

A fifth aspect is characterized in that in the second aspect, when the isochronous data transmitted by the sending station is received by the plurality of receiving stations in the isochronous data communication, the plurality of receiving stations respectively send out to the transmission path response signals for controlling the transmission of the isochronous data by the sending station and/or reporting the acknowledgment of the isochronous data communication by the receiving stations, and the sending station receives only the response signal sent out from only one receiving station out of the plurality of receiving stations.

According to the fifth aspect, only the response signal sent out from only one receiving station of the response signals sent out from the plurality of receiving stations is transmitted to the sending station. Therefore, no signal collision occurs on the transmission path.

A sixth aspect is directed to a communication network in which a plurality of stations are connected to each other by a loop-shaped transmission path, any one of the plurality of stations functioning as a master station, and asynchronous data communication relating to asynchronous data not requiring real time properties and isochronous data communication relating to isochronous data requiring the real time properties can be established, wherein actual IDs which are used at the time of the asynchronous data communication and are not overlapped with each other are respectively fixedly assigned to the stations, the master station sends out to the transmission path an inquiry token packet for inquiring whether or not each of the stations has a communication request of the asynchronous data, each of the stations sends out, provided that it holds the asynchronous data and the actual ID of the station to be a destination of transmission of the asynchronous data when it receives the inquiry token packet transmission through the transmission path, the communication request of the asynchronous data and the actual ID of the station to be the destination of transmission to the transmission path using a slot previously assigned to each of the stations, the master station sends out to the transmission path a token packet for asynchronous data in which a station to be a source of transmission of the asynchronous data (hereinafter referred to as a sending station) and a station to be a destination of transmission of the asynchronous data (hereinafter referred to as a receiving station) are designated using the actual IDs on the basis of the communication request of the asynchronous data and the actual ID of the station to be the destination of transmission which are transmitted through the transmission path, and the station which sends out the communication request of the asynchronous data transmits, when the token packet for asynchronous data in which the station is designated as a sending station is transmitted through the transmission path, the asynchronous data to be transmitted to the receiving station, so that the synchronous data communication is started.

According to the sixth aspect, the master station can recognize the stations which establish the asynchronous data communication of the stations accommodated in the network using the communication request sent out on the basis of the inquiry token packet. Consequently, the master station can efficiently send out the token packet for asynchronous data without sending out an unnecessary token packet for asynchronous data. Moreover, the master station sends out the token packet for asynchronous data to the station having the communication request, so that it can fairly send out the token packet for asynchronous data.

A seventh aspect is characterized in that in the sixth aspect, each of the stations further sends out the actual ID of the station which is a source of transmission of the asynchronous data when it receives the inquiry token packet transmitted through the transmission path.

According to the seventh aspect, the master station can recognize the actual ID of the station transmitting the asynchronous data, so that it can send out the token packet for asynchronous data more efficiently.

An eighth aspect is characterized in that in the seventh aspect, each of the stations further sends out information representing the amount and/or the priority of the asynchronous data when it receives the inquiry token packet transmitted through the transmission path.

According to the eight aspect, the master station can recognize the amount and/or the priority of the asynchronous data which are sent out by the station transmitting the asynchronous data, so that it can send out the efficient token packet for asynchronous data corresponding to the amount and/or the priority.

A ninth aspect is characterized in that in the eighth aspect, the master station further sends out to the transmission path an identification signal for each of the stations to identify the slot after sending out the inquiry token packet.

According to the ninth aspect, each of the stations can easily identify the slot using the identification signal sent out by the master station.

A tenth aspect is characterized in that in the ninth aspect, the sending station sends out, provided that the asynchronous data and the actual ID of the station to be a destination of transmission of the asynchronous data are set in its inner by an equipment connected to the external thereof when it receives the inquiry token packet transmitted through the transmission path to the inner, the communication request of the asynchronous data and the actual ID of the station to be the destination of transmission to the transmission path using the slot, and the asynchronous data corresponding to one packet and the actual ID of a source of transmission of the asynchronous data which are transmitted through the transmission path from the sending station are stored in the receiving station and then read out by the equipment connected to the external thereof.

According to the tenth aspect, the sending station can sent out the communication request when the asynchronous data and the actual ID of the station to be a destination of transmission of the asynchronous data are set in the inner by the equipment connected to the outside thereof. After the asynchronous data corresponding to one packet stored in the receiving station, the equipment can read out the asynchronous data.

An eleventh aspect is characterized in that in the sixth aspect, each of the plurality of stations belongs to any one of a plurality of predetermined groups, the master station sends out the inquiry token packet to the transmission path for each of the groups, each of the stations receives the inquiry token packet transmitted through the transmission path, and sends out, provided that it holds the asynchronous data and the actual ID of the station to be a destination of transmission of the asynchronous data when the token packet is for the group to which the station belongs, the communication request of the asynchronous data and the actual ID of the station to be the destination of transmission to the transmission path using a slot previously assigned to each of the stations, the master station sends out to the transmission path a token packet for asynchronous data in which the sending station and the receiving station are designated using the actual IDs on the basis of the communication request of the asynchronous data and the actual ID of the station to be the destination of transmission which are transmitted through the transmission path for each groups, and the station which sends out the communication request of the asynchronous data transmits, when the token packet for asynchronous data in which the station is designated as the sending station is transmitted through the transmission path, the asynchronous data to be transmitted to the receiving station, so that the asynchronous data communication is started.

According to the eleventh aspect, the plurality of stations are divided into groups. Therefore, the master station can send out the token packet for asynchronous data more efficiently.

A twelfth aspect is characterized in that the eleventh aspect, the master station sends out, next time it sends out the inquiry token packet to the certain group of the plurality of groups, the inquiry token packet to the other group.

According to the twelfth aspect, the master station can fairly send out the inquiry token packet for each group.

A thirteenth aspect is characterized in that in the twelfth aspect, each of the stations receives the inquiry token packet transmitted through the transmission path, and further sends out, when the token packet is for the group to which the station belongs, the actual ID of the station to be a source of transmission of the asynchronous data.

According to the thirteenth aspect, the master station can recognize the actual ID of the station transmitting the asynchronous data, so that it can send out the token packet for asynchronous data more efficiently.

A fourteenth aspect is characterized in that in the thirteenth aspect, each of the stations receives the inquiry token packet transmitted through the transmission path, and further sends out, when the token packet is for the group to which the station belongs, information representing the amount and/or the priority of the asynchronous data.

According to the fourteenth aspect, the master station can recognize the amount and/or the priority of the asynchronous data which are sent out by the station transmitting the asynchronous data, so that it can send out the efficient token packet for asynchronous data corresponding to the amount and/or the priority.

A fifteenth aspect is characterized in that in the fourteenth aspect, the master station further sends out to the transmission path an identification signal for each of the stations to identify the slot after sending out the inquiry token packet.

According to the fifteenth aspect, each of the stations can easily identify the slot using the identification signal sent out by the master station.

A sixteenth aspect is characterized in that in the fifteenth aspect, the sending station receives the inquiry token packet transmitted through the transmission path to its inner, and sends out, provided that the asynchronous data and the actual ID of the station to be a destination of transmission of the asynchronous data are set in the inner by an equipment connected to the external thereof when the token packet is for the group to which the station belongs, a transmission request of the asynchronous data and the actual ID of the station to be the destination of transmission to the transmission path using the slot, and the asynchronous data corresponding to one packet and the actual ID of a source of transmission of the asynchronous data which are transmitted through the transmission path from the sending station are stored in the receiving station and then are read out by the equipment connected to the external thereof.

According to the sixteenth aspect, the sending station can send out the communication request when the asynchronous data and the actual ID of the station to be a destination of transmission of the asynchronous data are set in the inner by the equipment connected to the external thereof. After the asynchronous data corresponding to one packet is stored in the receiving station, the equipment can read out the asynchronous data.

In a communication network in which a plurality of stations are connected to each other by a loop-shaped transmission path, any one of the plurality of stations functioning as a master station, the stations other than the master station functioning as slave stations, and asynchronous data communication relating to asynchronous data not requiring real time properties and isochronous data communication relating to isochronous data requiring the real time properties can be established, a seventeenth aspect is directed to a method of setting actual IDs which are used at the time of the asynchronous data communication and are not overlapped with each other, wherein the slave stations are respectively initially assigned initial IDs which are common at least among the slave stations and further respectively comprise switches for switching between connection and disconnection of the transmission path, the master station sends out to the transmission path a token packet for switching which can be received by the slave stations having the initial IDs, and then sends out to the transition path an actual ID setting command for respectively setting the actual IDs which differ from each other in the slave stations, each of the slave stations disconnects the transmission path using the switch when it receives the token packet for switching from the master station in a case where it has the initial ID, not to transmit a receiving signal to the station positioned on the downstream side of the slave station on the transmission path, each of the slave stations sets, when it receives through the transmission path the actual ID setting command from the master station in a case where it has the initial ID, the actual ID on the basis of the received command, and each of the slave stations connects the transmission path using the switch when the actual ID is set therein, to transmit to the station positioned on the downstream side of the slave station on the transmission path the subsequent token packet for switching transmitted through the transmission path from the master station, so that the actual IDs are successively set in the slave stations, starting in the slave station positioned on the downstream side of the master station and nearest thereto.

According to the seventeenth aspect, the actual ID is automatically set in each of the stations. Therefore, it becomes easy to manage the actual IDs.

An eighteenth aspect is characterized in that in the seventeenth aspect, each of the slave stations transmits, after the actual ID is set therein, an actual ID setting acknowledgment indicating that the actual ID is set to the master station.

According to the eighteenth aspect, the master station can recognize that the actual ID is correctly set in the slave station using the actual ID setting acknowledgment.

A nineteenth aspect is characterized in that in the seventeenth aspect, each of the stations synchronizes an internal clock with a clock of the master station by receiving the token packet for switching sent out by the master station for each predetermined time period and transmitted through the transmission path.

A twentieth aspect is characterized in that in the eighteenth aspect, each of the stations synchronizes an internal clock with a clock of the master station by receiving the token packet for switching sent out by the master station for each predetermined time period and transmitted through the transmission path.

According to the nineteenth and twentieth aspects, each of the slave stations can easily synchronize the internal clock with the clock of the master station using the token packet for switching.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an actual ID and an ID for isochronous data which are set in each of stations $1_1$ to $1_4$ shown in FIG. 4;

DESCRIPTION OF THE PREFERRED EMBODIMENTS

Figure 1:
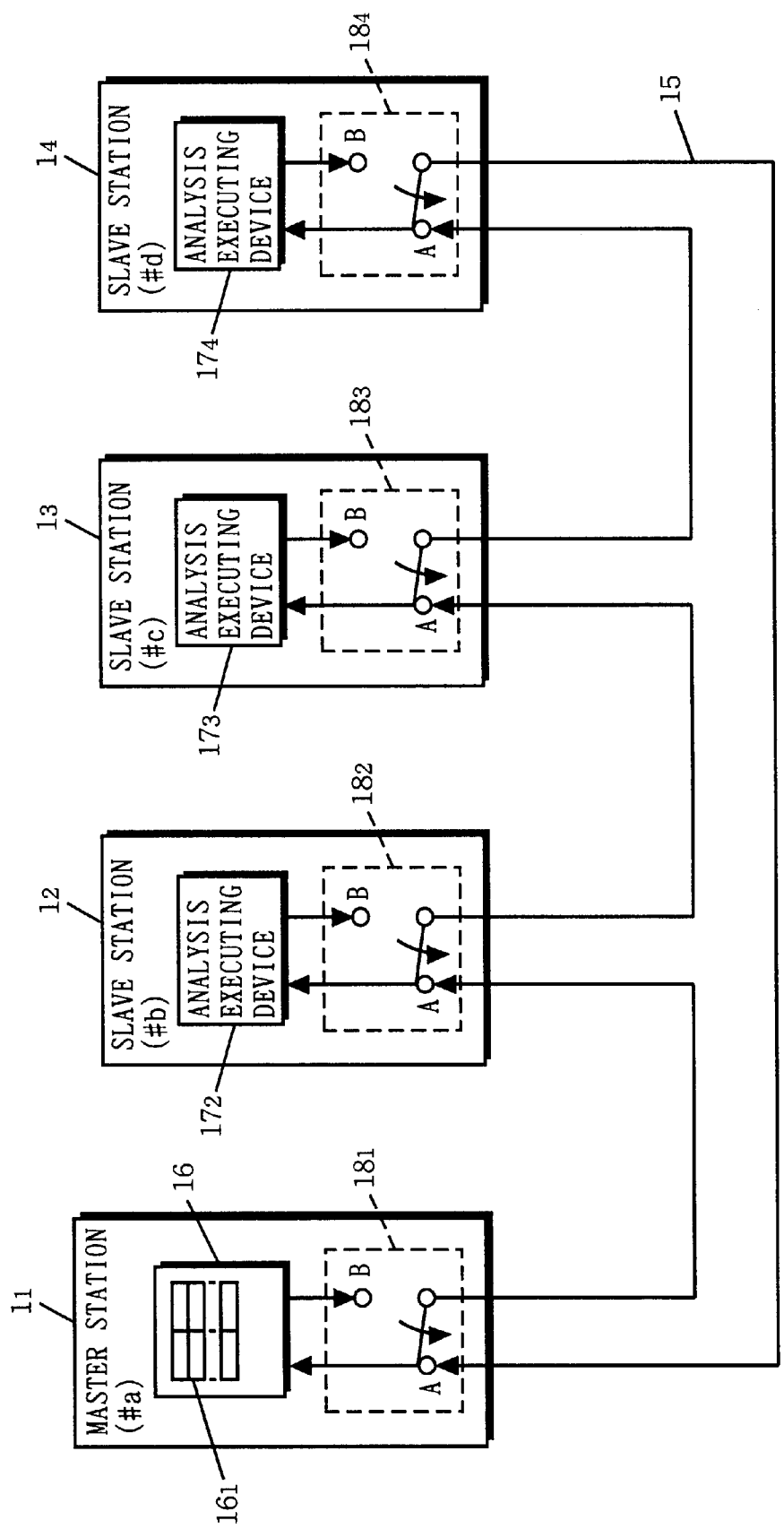
FIGS. 1 to 3 are diagrams for explaining the procedure for point to point communication in a communication network.
Figure 2:
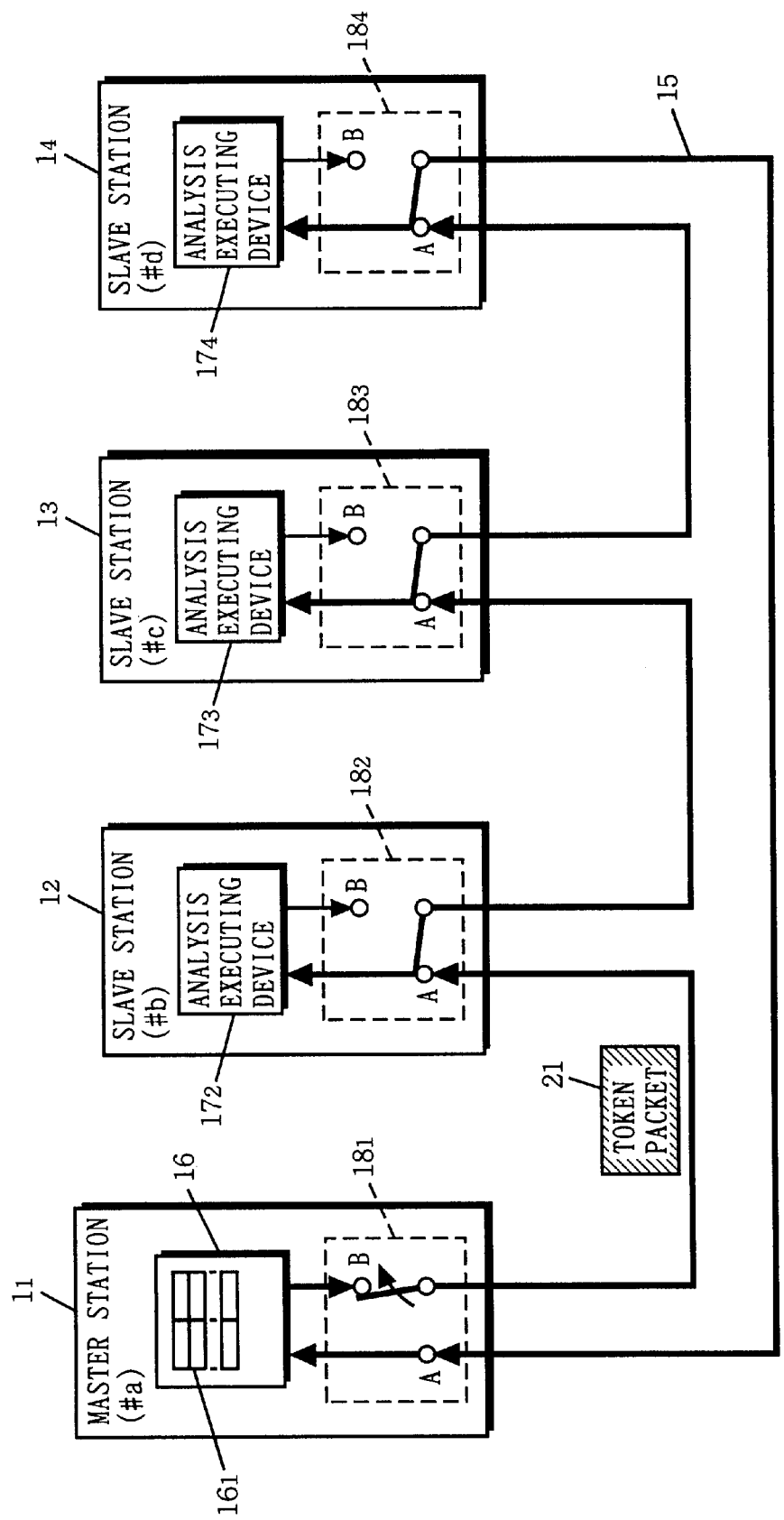
Figure 3:
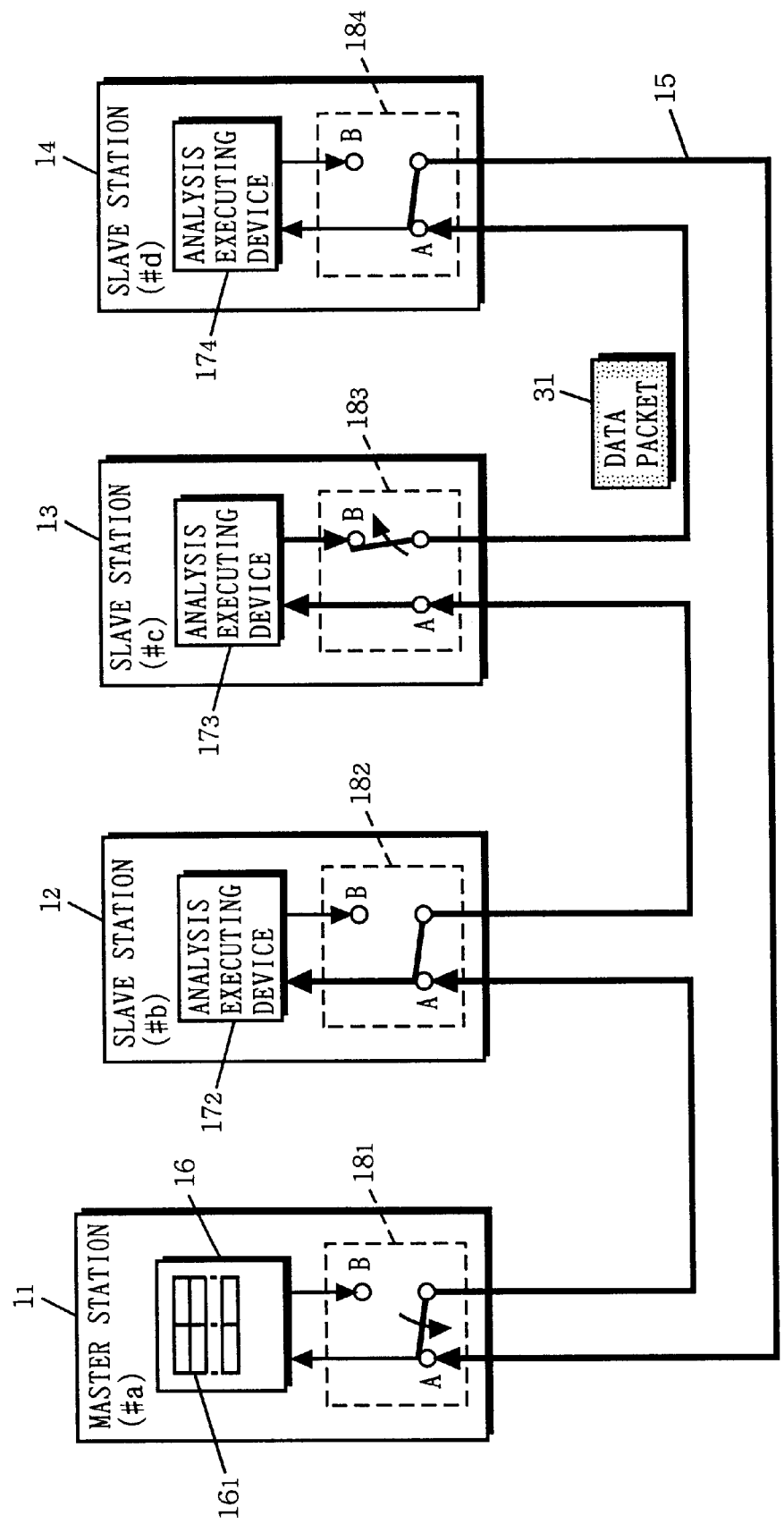

Although the procedure for point to point communication in a communication network will be first summarized with reference to FIGS. 1 to 3, the details of the procedure for communication should be referred to because it is disclosed in copending U.S. patent application Ser. No. 08/843,597 filed on Apr. 16, 1997 (now U.S. Pat. No. 6,005,869) and assigned to the same assignee of the present application. In FIGS. 1 to 3, a plurality of stations (four stations $1_1$ to $1_4$ are illustrated) are connected so as to be capable of communicating with each other by a loop-shaped transmission 15. Identifiers (hereinafter referred to as actual IDs) #a to #d which are not overlapped with each other are fixedly assigned to the stations $1_1$ to $1_4$. The station $1_1$ functions as a master station, and the other stations $1_2$ to $1_4$ function as slave stations (which may, in some cases, be hereinafter referred to as the master station $1_1$ and the slave stations $1_2$ to $1_4$). The master station $1_1$ comprises a token packet sending/analysis executing device 16 and a switch $18_1$. The slave stations $1_2$ to $1_4$ comprise analysis executing devices $17_2$ to $17_4$ and switches $18_2$ to $18_4$.

The procedure for data communication in the communication network constructed as described above will be described below. At the time of the initial state of the communication network, the stations $1_1$ to $1_4$ connect the switches $18_1$ to $18_4$ to terminals $A_1$ to connect the transmission path 15 (see FIG. 1).

The master station $1_1$ then produces a token packet 21 in which a station to be a source of transmission of data (hereinafter referred to as sending station) and a station to be a destination of transmission of the data (hereinafter referred to as receiving station) are designated using the actual IDs in accordance with contents described in a table $16_1$ held so as to manage a transmission bandwidth in the token packet sensing/analysis executing devices 16. The master station $1_1$ connects the switch $18_1$ to a terminal $B_1$ to disconnect the transmission path 15 immediately after producing the token packet 21, and sends out the token packet 21 to the transmission path 15 on the downstream side through the switch $18_1$ from the token packet sending/analysis executing device 16 (see FIG. 2).

As shown in FIG. 2, the switches $18_2$ to $18_4$ in the slave stations $1_2$ to $1_4$ are connected to the terminals A. Therefore, the slave stations $1_2$ to $1_4$ branch the token packet 21 arriving from the transmission path 15 on the upstream side into two token pieces 21 in portions of the terminals A of the switches $18_2$ to $18_4$. One branched token packet 21 is received and analyzed by the analysis executing devices $17_2$ to $17_4$. On the other hand, the other branched token packet 21 is sent out to the transmission path 15 on the downstream side of the slave stations $1_2$ to $1_4$. Accordingly, the token packet 21 sent out from the master station $1_1$ circulates around the transmission path 15 while being received by the slave stations $1_2$ to $1_4$ positioned on the transmission path 15, and returns to the master station $1_1$. The master station $1_1$ receives and analyzes the returned token packet 21, and then deletes the token packet 21, and connects the switch $18_1$ to the terminal A, to connect the transmission path 15.

The token packet sending/analysis executing device 16 and each of the analysis executing devices $17_2$ to $17_4$ analyzes the received token packet 21, to judge whether or not the actual ID of the sending station or the actual ID of the receiving station which is designed by the token packet identifies with the actual ID of the station. When it is assumed that an actual ID; #c and an actual ID; #b are set as the actual ID of the sending station and the actual ID of the receiving station, the slave station $1_3$ judges that data transmission is enabled because the actual IDs of the sending station and the slave station identify with each other, and the slave station $1_2$ judges that data receiving is enabled because the actual IDs of the receiving station and the slave station identify with each other.

The slave station $1_3$ connects, when it holds a data packet 31 to be transmitted immediately after judging that data transmission is enabled, the switch $18_3$ to the terminal B to disconnect the transmission path 15 as shown in FIG. 3 after an elapse of a predetermined time period since the token packet was received, and sends out the data packet 31 to the transmission path 15 on the downstream side. The data packet 31 circulates around the transmission path 15 when the slave station $1_3$ switches the switch $18_3$. The slave station $1_2$ receives, when it judges that data receiving is enable, the data packet 31 arriving from the upstream side on the transmission path 15 within a predetermined time period since the token packet 21 was received. Further, the slave station $1_3$ deletes, when the data packet 31 sent out by itself returns upon circulating around the transmission path 15, the data packet 31, and connects the switch $18_3$ to the terminal A to connect the transmission path 15. Consequently, the communication network enters the same state as that shown in FIG. 1, so that the same procedure for communication as that described above with reference to FIGS. 1 to 3 is repeated again.

In the communication network, therefore, point to point communication can be established between the sending station and the receiving station which are designated using the actual IDs included in the token packet. Further, the master station $1_1$ sends out the token packet 21 at predetermined time intervals in accordance with the contents described in the table $16_1$ for managing the transmission bandwidth in the communication network. The master station $1_1$ ensures the transmission bandwidth on the table $16_1$ when isochronous data is communicated between the sending station and the receiving station. Consequently, the real time properties of the isochronous data (data requiring strict time management such as AV (Audio Video) data) are ensured.

As described in the foregoing, in the communication network shown in FIGS. 1 to 3, there are some problems. For example, it is difficult to ensure communication between one station and a plurality of stations (multicast communication). The applicant of the present application discloses communication networks according to first to eight embodiments described below in order to solve the problems.

First Embodiment

Figure 4:
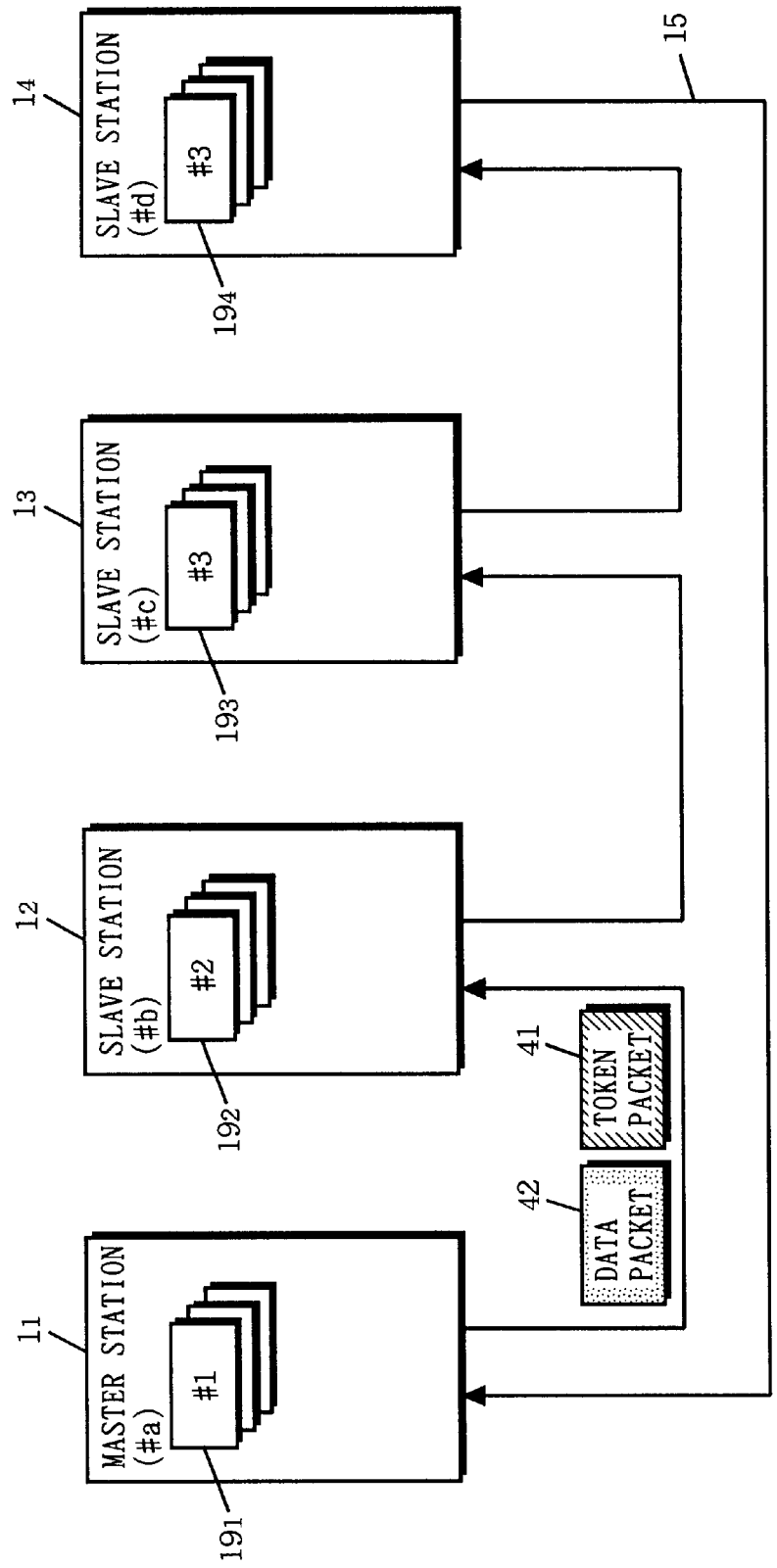
FIG. 4 illustrates the structure of a communication network according to a first embodiment of the present invention.

FIG. 4 illustrates the structure of a communication network according to a first embodiment of the present invention. The communication network shown in FIG. 4 has approximately the same structure as that shown in FIGS. 1 to 3. Therefore, in FIG. 4, the same reference numerals are assigned to structures corresponding to the structures shown in FIGS. 1 to 3 and hence, the description thereof is not repeated. Stations $1_1$ to $1_4$ shown in FIG. 4 are the same as the stations shown in FIGS. 1 to 3 in that actual IDs; #a to #d are respectively fixedly assigned thereto, and differ from the stations shown in FIGS. 1 to 3 in that IDs for isochronous data are dynamically assigned thereto. The actual IDs are used for not only asynchronous data communication but also isochronous data point to point communication in the communication network shown in FIGS. 1 to 3. However, attention must be given to the fact that the actual IDs are used only in the case of asynchronous data communication in the first embodiment. On the other hand, the IDs for isochronous data are used in the case of isochronous data communication because a plurality of IDs for isochronous data can be set with respect to one station and overlapped values can be set in a plurality of stations. Further, the stations $1_1$ to $1_4$ comprise ID holding portions $19_1$ to $19_4$ each capable of storing a plurality of IDs for isochronous data.

FIG. 5 is a diagram showing an actual ID and an ID for isochronous data which are set in each of the stations $1_1$ to $1_4$ shown in FIG. 4. As described above, the actual IDs in the respective stations $1_1$, $1_2$, $1_3$ and $1_4$ shall be "#a", "#b", "#c" and "#d". The actual IDs are thus inherent in the stations, and are not overlapped with each other. In the stations $1_1$, $1_2$, $1_3$ and $1_4$, one or more IDs for isochronous data are respectively set in addition to the actual IDs in the ID holding portions $19_1$, $19_2$, $19_3$ and $19_4$. It is assumed that the IDs for isochronous data in the stations $1_1$, $1_2$, $1_3$ and $1_4$ are set to "#1", "#2", "#3" and "#3". The same ID for isochronous data "#3" is thus set in the slave station $1_3$ and the slave station $1_4$, so that the slave stations form a broadcast group.

Description is now made of the procedure for data communication in the communication network constructed as described above. For example, when isochronous data is transmitted from the master station $1_1$ to the slave station $1_2$, the master station $1_1$ sends out a token packet for isochronous data 41 in which the master station $1_1$ and the slave station $1_2$ serving as a sending station and a receiving station (as described above) are designated using the IDs for isochronous data "#1" and "#2". In this case, the above-mentioned normal point to point communication is established and hence, the detailed description thereof is omitted.

For example, even when isochronous data is transmitted from the slave station $1_2$ to the slave stations $1_3$ and $1_4$, the procedure for data communication as shown in FIGS. 1 to 3 is basically carried out. That is, the master station $1_1$ produces a token packet for isochronous data 41 in which the slave station $1_2$ and the slave stations $1_3$ and $1_4$ serving as a sending station and receiving stations are designated using the IDs for isochronous data "#2" and "#3" in accordance with contents described in the table $16_1$ held so as to manage the transmission bandwidth in the token packet sending/analysis executing device 16, and sends out the token packet 41 to the transmission path 15 on the downstream side (operations at this time are the same as those in the case of the master station $1_1$ described using FIG. 2). As apparent from the foregoing, the slave station $1_2$ sends out an isochronous data packet 42 to the transmission path 15 using the token packet for isochronous data 41. According to the token packet for isochronous data 41, the slave stations $1_3$ and $1_4$ are designated as receiving stations using the ID for isochronous data "#3", so that the slave stations $1_3$ and $1_4$ perform the above-mentioned operations, to receive the isochronous data packet 42. A sending station can thus transmit the same isochronous data to a plurality of receiving stations belonging to a broadcast group, thereby multicast communication (communication to a plurality of nodes) can be established.

In the stations $1_1$ to $1_4$, one or more IDS for isochronous data are respectively held in the ID holding portions $19_1$ to $19_4$. IDs for isochronous data having the same value are set in the stations 1 other than the sending station, thereby broadcast communication of the isochronous data can be established.

Figure 6:
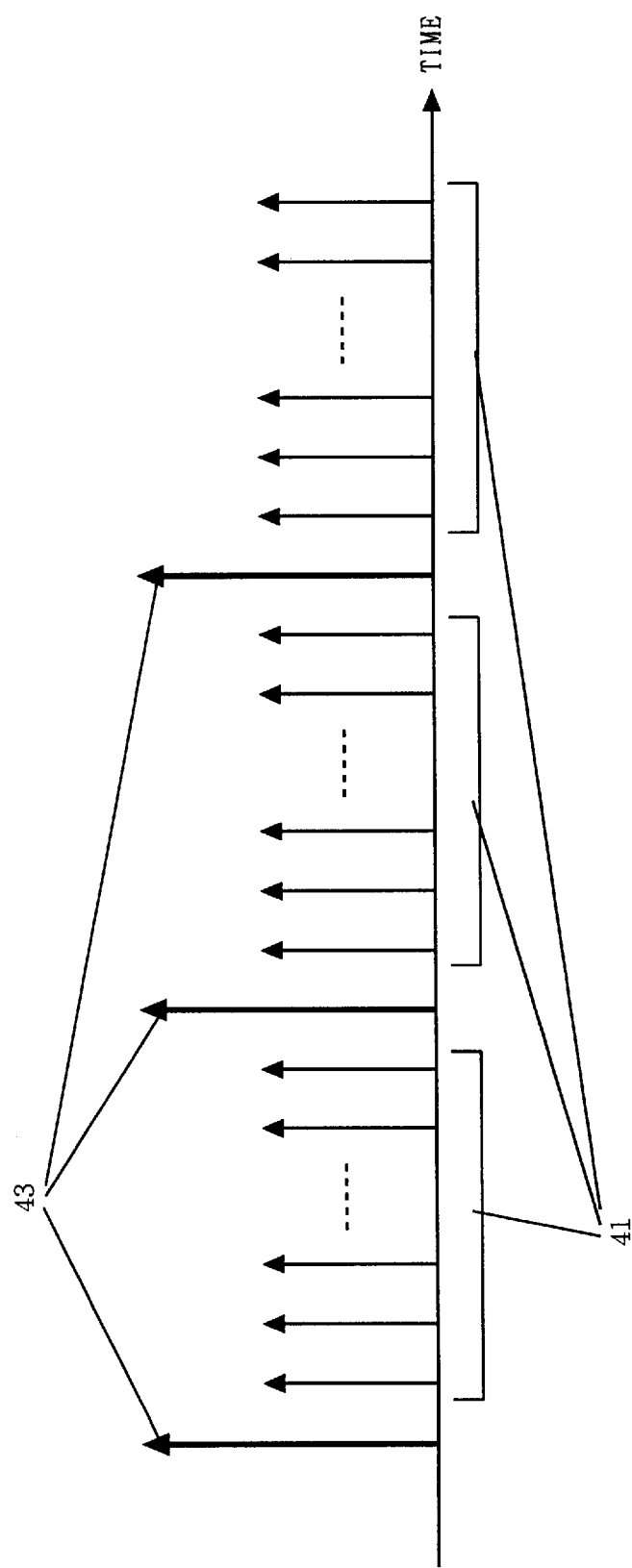
FIG. 6 is a timing chart of two types of token packets (for isochronous data and for asynchronous data) used in the communication network shown in FIG. 4.

In the first embodiment, each of the stations 1 holds one or more IDs for isochronous data which can be set to arbitrary values in addition to the actual ID. A plurality of stations in which IDs for isochronous data having overlapped values are set to form a broadcast group, to receive the same isochronous data. In the first embodiment, the IDs for isochronous data are thus overlapped with each other, so that the plurality of stations can be designated as receiving stations. Consequently, the communication network according to the first embodiment can ensure multicast communication FIG. 6 is a timing chart of two types of token packets (for isochronous data and for asynchronous data) used in the communication network shown in FIG. 4. As shown in FIG. 6, the master station $1_1$ sends out a token packet for isochronous data 41 or a token packet for asynchronous data 43 for each predetermined time period. In this example, the master station $1_1$ continuously sends out m (m is an integer of one or more) token packets for isochronous data 41 onto the transmission path 15, and then sends out one token packet for asynchronous data 43 onto the transmission path 15. The master station $1_1$ repeats the series of operations for sending out the token packets. Each of the stations $1_1$ to $1_4$ can judge the two types of token packets 41 and 43. Specifically, the two types of token packets 41 and 43 include packet type information in addition to actual IDs for designating a sending station and a receiving station (as described above). The packet type information indicates whether the token packet is for isochronous data communication or for asynchronous data communication. Each of the stations $1_1$ to $1_4$ judges whether the token packet is for isochronous data communication (the token packet 41) or for asynchronous data communication (the token packet 43) on the basis of the packet type information of the received token packet. Each of the stations $1_1$ to $1_4$ executes, when it receives the token packet for isochronous data 41, analysis as to whether the IDs for isochronous data set in the ID holding portion 19 in the station identify with the IDs for isochronous data of the sending station and the receiving station, to establish the above-mentioned isochronous data communication. Further, each of the stations $1_1$ to $1_4$ executes, when it receives the token packet for asynchronous data 43, analysis as to whether the actual ID fixedly assigned to the station identifies with the actual IDs of the sending station and the receiving station, to establish the asynchronous data communication.

By the asynchronous data communication, the IDs for isochronous data in the ID holding portions $19_1$ to $19_4$ in the stations $1_1$ to $1_4$ are rewritten. This rewriting makes it easily feasible to start and terminate the transmission in the case of isochronous data point to point communication, to add the station to the broadcast group and to withdraw the station from the broadcast group in the case of multicast communication. In the communication network according to the first embodiment, the IDs for isochronous data can be thus dynamically rewritten as required, so that multicast communication (and broadcast communication) can be ensured without requiring IDs for isochronous data corresponding to combinations of all the stations.

Second Embodiment

Figure 7:
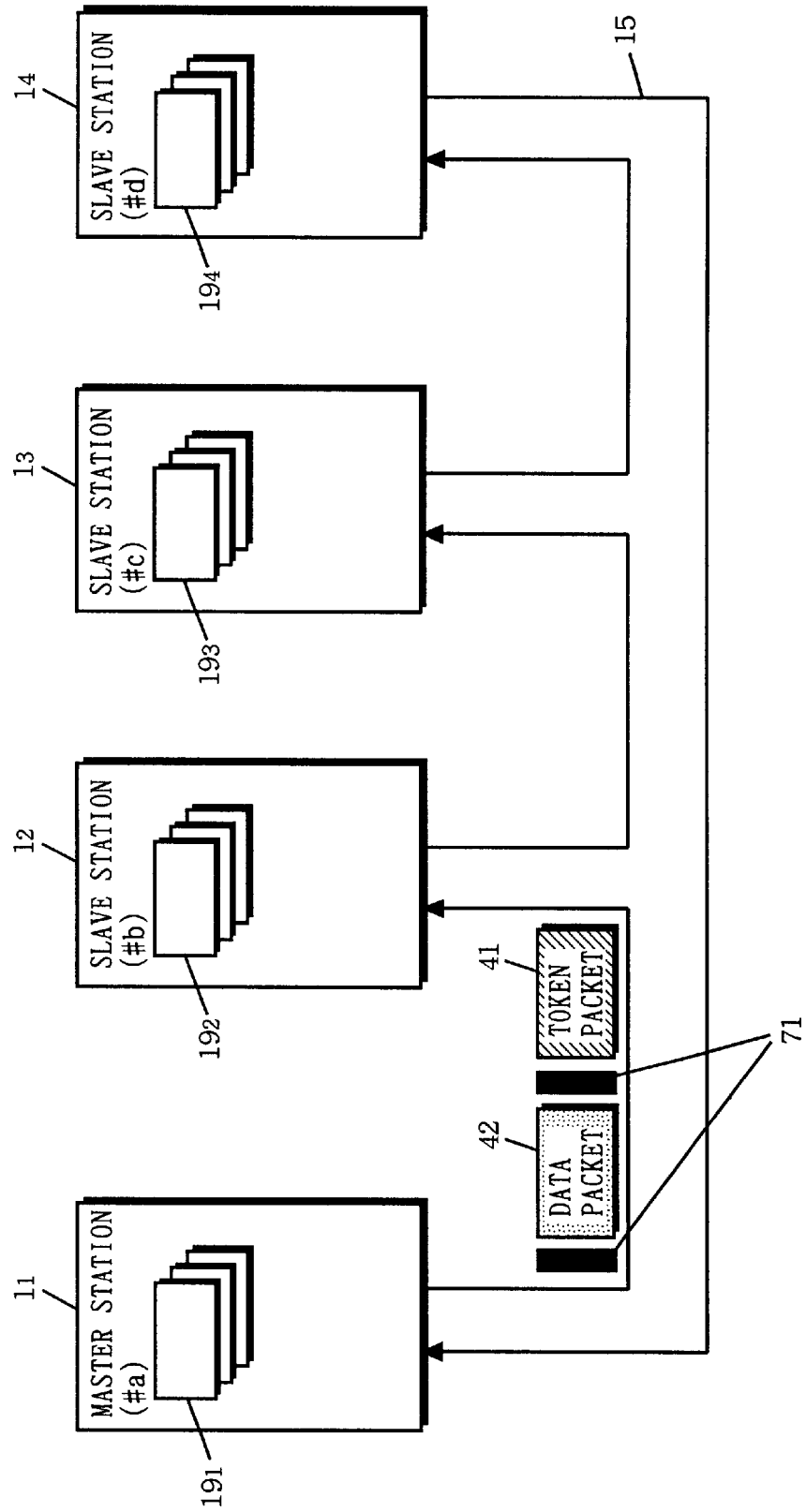
FIG. 7 illustrates the structure of a communication network according to a second embodiment of the present invention.

FIG. 7 illustrates the structure of a communication network according to a second embodiment of the present invention. The communication network shown in FIG. 7 has approximately the same structure as the communication network according to the first embodiment. Therefore, in FIG. 7, the same reference numerals are assigned to structures corresponding to the structures shown in FIGS. 1 to 3 and FIG. 4 and hence, the description thereof is not repeated. Description is now made of the procedure for data communication in the communication network according to the second embodiment mainly with respect to the difference from the first embodiment.

In the initial state of the communication network, IDs for isochronous data are not set in ID holding portions $19_1$ to $19_4$ in stations $1_1$ to $1_4$. The master station $1_1$ sends out a token packet for isochronous data 41 or a token packet for asynchronous data 43 onto a transmission path 15 for each predetermined time period, as shown in FIG. 6. However, isochronous data communication is not established, and only asynchronous data communication is established. In the master station $1_1$, the IDs for isochronous data are set in the ID holding portions $19_1$ to $19_4$ by the asynchronous data communication using the token packet for asynchronous data 43 in order to start point to point communication of isochronous data or multicast communication of isochronous data (see the first embodiment). The master station $1_1$ designates the only one station 1 of the plurality of stations 1 in which the same ID for isochronous data is set, that is, the plurality of stations 1 belonging to a broadcast group as a group leader at the time of setting the IDs for isochronous data. The master station $1_1$ designates the station 1 in which the ID for isochronous data is set as a group leader even in the case of isochronous data point to point communication. Although isochronous data point to point communication is established at the beginning, the transition to multicast communication may occur by thereafter rewriting the ID for isochronous data (as described above). In the point to point communication of isochronous data and the multicast communication of isochronous data, the station 1 which is a group leader of the stations 1 receiving isochronous data sends out a response signal 71 immediately before the data packet 42, immediately after the data packet 42, both immediately before and immediately after the data packet 42, as shown in FIG. 7. The station 1 which is not a group leader of the stations 1 receiving the isochronous data (a broadcast group) does not send out the response signal 71. The only one station 1 to be a group leader in the broadcast group sends out the response signal 71 immediately before the data packet 42 is sent out, to control the sending of the data packet 42 from a sending station. Consequently, the sending station can wait for the sending of the data packet, so that it can also correspond with data communication at a variable bit rate (hereinafter referred to as VBR). Further, the station 1 sends out the response signal 71 immediately after the data packet, so that the normal acknowledgement of the data communication is confirmed. Since the only one station in the broadcast group sends out the response signal 71, no signal collision occurs on the transmission path 15.

The only one station 1 to be a group leader thus exists in the broadcast group, and only the group leader outputs the response signal 71, thereby making it possible to establish reliable data communication corresponding to a VBR and causing no signal collision on the transmission path 15.

Figure 8:
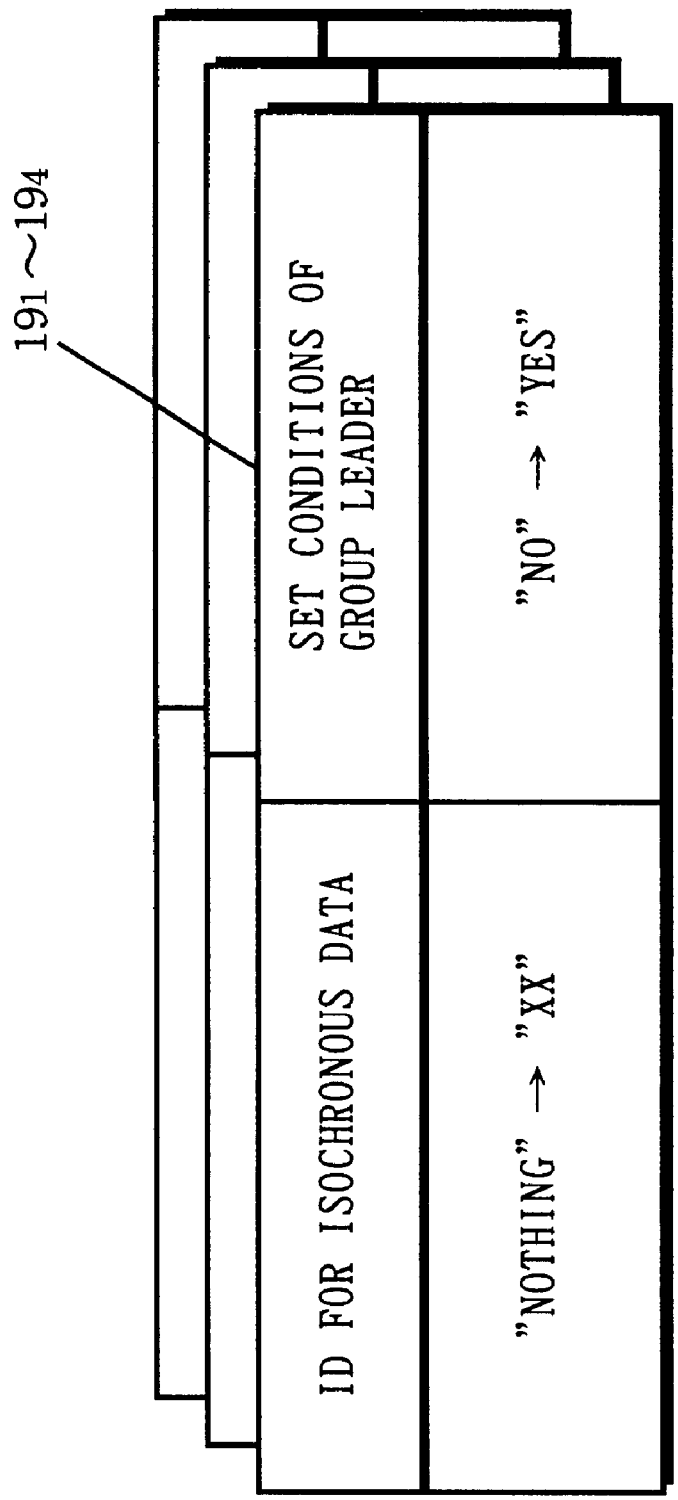
FIG. 8 illustrates the structures of ID holding portions $19_1$ to $19_4$ in stations $1_1$ to $1_4$ shown in FIG. 7.

FIG. 8 illustrates the structures of the ID holding portions $19_1$ to $19_4$ in the stations $1_1$ to $1_4$ shown in FIG. 7. In FIG. 8, the ID holding portions $19_1$ to $19_4$ include fields holding IDs for isochronous data in the stations $1_1$ to $1_4$ and the set conditions of the group leader.

In the initial state of the communication network, the IDs for isochronous data are not also assigned to the stations $1_1$ to $1_4$, so that any of the stations $1_1$ to $1_4$ cannot be a group leader. In order to indicate such situations, "NOTHING" is set as the ID for isochronous data, and "NO" is further set as the set conditions of the group leader in each of the ID holding portions $19_1$ to $19_4$. Under such situations, the master station $1_1$ sends out the token packet for isochronous data 41 or the token packet for asynchronous data 43 to the transmission path 15 for each predetermined time period, as shown in FIG. 6. However, isochronous data communication is not established, and only asynchronous data communication is established. In the master station $1_1$, IDs for isochronous data are set in the respective ID holding portions $19_1$ to $19_4$ and a group leader is further set by the asynchronous data communication using the token packet for asynchronous data 43 in order to start point to point communication of isochronous data or multicast communication of isochronous data. By setting the ID for isochronous data and the group leader using the asynchronous data communication, "XX" is set as the ID for isochronous data in the ID holding portions 19 in the plurality of stations 1, and "YES" is further set as the set conditions of the group leader in the ID holding portion 19 in the only one station 1 of the plurality of stations 1 in which the same ID for isochronous data is set, for example. Consequently, only the station 1 set as the group leader can send out the above-mentioned response signal 71 to the transmission path 15.

By the asynchronous data communication, the ID for isochronous data and the set conditions of the group leader are thus rewritten in the ID holding portion 19, thereby making it easy to add each of the stations $1_1$ to $1_4$ to the broadcast group and withdraw each of the stations from the broadcast group as well as to change the group leader in the broadcast group.

In the above-mentioned second embodiment, description was made of the situations where the ID for isochronous data and the group leader are simultaneously rewritten in the ID holding portions 19 in the plurality of stations 1. However, the ID for isochronous data and the group leader may be separately rewritten in the ID holding portions 19 in the plurality of stations 1, in which case the same effect as described above is obtained. Further, it is also easily feasible to change the station 1 in which the group leader has been set once into the other station 1.

Third Embodiment

Figure 9:
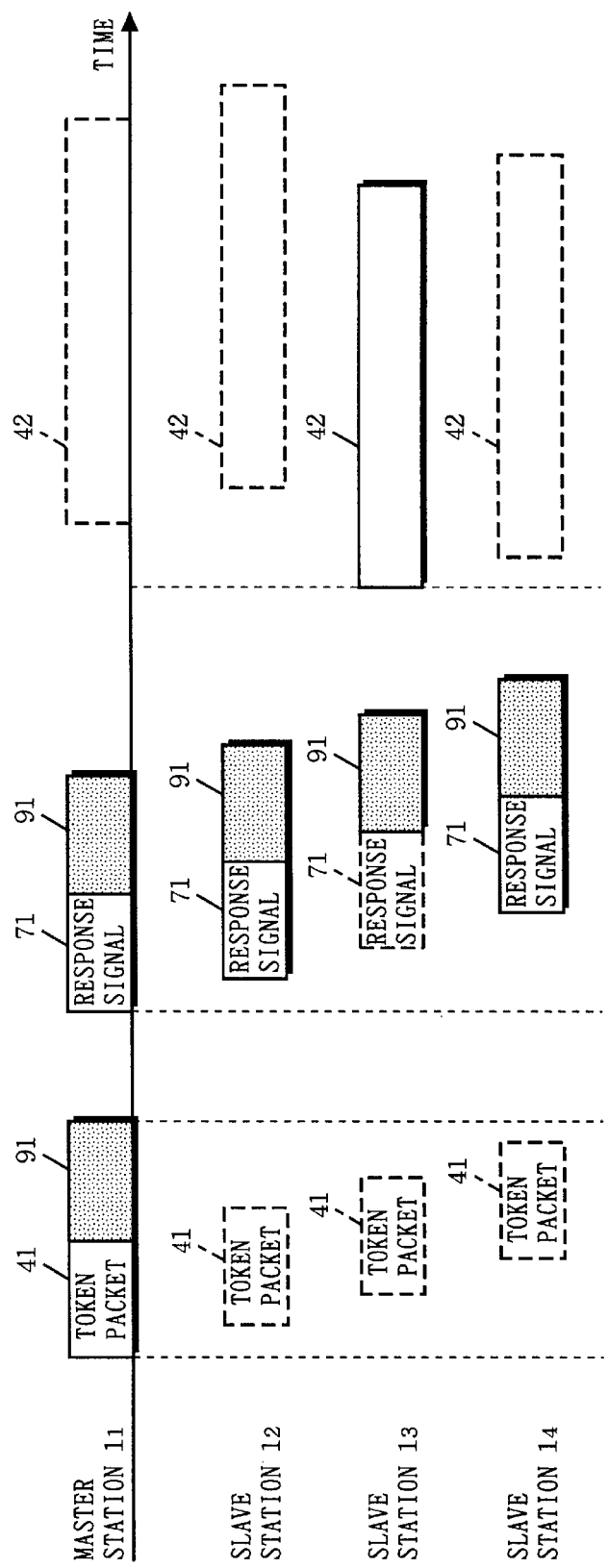
FIG. 9 is a timing chart of signal sent out and received by each of stations $1_1$ to $1_4$ in a communication network according to a third embodiment of the present invention.

FIG. 9 is a timing chart of signals sent out and received by each of stations $1_1$ to $1_4$ in a communication network according to a third embodiment of the present invention. In FIG. 9, a square portion indicted by a solid line represents the timing of sending out each signal, and a square portion indicated by a dotted line represents the timing of receiving each signal. Further, the structure of the communication network according to the present embodiment is the same as the structure of the communication network according to the second embodiment. In the present embodiment, therefore, the same reference numerals are respectively assigned to structures corresponding to those in the second embodiment and hence, the description thereof is not repeated.

In FIG. 9, a master station $1_1$ sends out a token packet for isochronous data 41 to a transmission path 15 at predetermined timing in the same manner as described above. The token packet for isochronous data 41 is received by slave stations $1_2$ to $1_4$ with delays corresponding to the positional relationships among the slave stations $1_2$ to $1_4$ on the transmission path 15 on the basis of the time when the master station $1_1$ sends out the token packet, and is then received by the master station $1_1$ with a delay 91 corresponding to one circulation around the transmission path 15. A response signal 71 sent out by each of the stations $1_1$ to $1_4$ also circulates around the transmission path 15, and returns to each of the stations $1_1$ to $1_4$ sending out the response signal 71 when a time period corresponding to the delay 91 has elapsed. More specifically, each of the stations $1_1$ to $1_4$ disconnects the transmission path 15 by switching control of a switch in the station, to send out the response signal 71 to the transmission path 15 as described above. Each of the stations $1_1$ to $1_4$ receives the response signal 71 sent out by itself when the time period corresponding to the delay 91 which corresponds to one circulation around the transmission path 15 has elapsed. Immediately after each of the stations $1_1$ to $1_4$ receives the response signal 71 sent out by itself, a state where the transmission path 15 is disconnected is returned to a state where it is connected by switching control of the switch.

It is assumed that the master station $1_1$ and the slave stations $1_2$ and $1_4$ belong the same broadcast group, and the slave station $1_3$ transmits isochronous data to the broadcast group. First, a response signal $71_1$ sent out by the master station $1_1$ is transmitted to the slave station $1_2$ through the transmission path 15. At the timing at which the response signal $71_1$ sent out from the master station $1_1$ arrives at the slave station $1_2$, the slave station $1_2$ disconnects the transmission path 15 by switching control of the switch because it is a receiving station, to receive and at the same time send out a response signal $71_2$ sent out by itself to the transmission path 15 on the downstream side. Therefore, the response signal $71_1$ sent out by the master station $1_1$ is transmitted only to the slave station $1_2$, and is deleted by the slave station $1_2$. That is, the response signal $71_1$ is not transmitted to the transmission path 15 on the downstream side of the slave station $1_2$. However, the slave station $1_2$ sends out the response signal $71_2$ sent out by itself, and the response signal $71_2$ is transmitted to the slave station $1_3$. The slave station $1_3$ which is a sending station receives the response signal $71_2$ and at the same time, passes the response signal $71_2$ to the transmission path 15 on the downstream side, and then the response signal $71_2$ is transmitted to the slave station $1_4$. The slave station $1_4$ is operated similarly to the slave station $1_2$ because it is also a receiving station, so that the response signal $71_2$ which arrived is received without being transmitted to the transmission path 15 on the downstream side and is deleted. Further, the slave station $1_4$ sends out a response signal $71_4$ sent out by itself to the transmission path 15 on the downstream side. The response signal $71_4$ is also received by the master station $1_1$ which is a receiving station and is deleted. As a result, even when all the stations 1 belonging to the broadcast group (the master station $1_1$ and the slave stations $1_2$ and $1_4$ in this description) send out the response signals to the transmission path 15, no signal collision occurs on the transmission path 15. To the sending station 1 transmitting the data packet 42 (the slave station $1_3$ in this description), only the response signal sent out by the station 1 positioned on the upstream side of the sending station 1 and nearest thereto (the slave station $1_2$ in this description) of the stations 1 belonging to the broadcast group is transmitted.

The slave station $1_2$ which is a sending station receives the response signal $71_2$ and at the same time, passes the response signal $71_2$, and then switches the switch $18_2$ in the slave station to disconnect the transmission path 15, and sends out the data packet 42 to the transmission path 15 on the downstream side. The data packet 42 is received by all the stations 1 belonging to the broadcast group (the slave station $1_4$, the master station $1_1$, and the slave station $1_2$ in this order in this description) as described above.

In the third embodiment, all the stations 1 belonging to the broadcast group thus send out the response signals 71, unlike the second embodiment. However, the only one response signal 71 of the plurality of response signals sent out is received by the sending station, so that no signal collision occurs on the transmission path 15. This also makes it possible to establish data communication corresponding to a VBR and high is reliability, as in the second embodiment.

Fourth Embodiment

Figure 10:
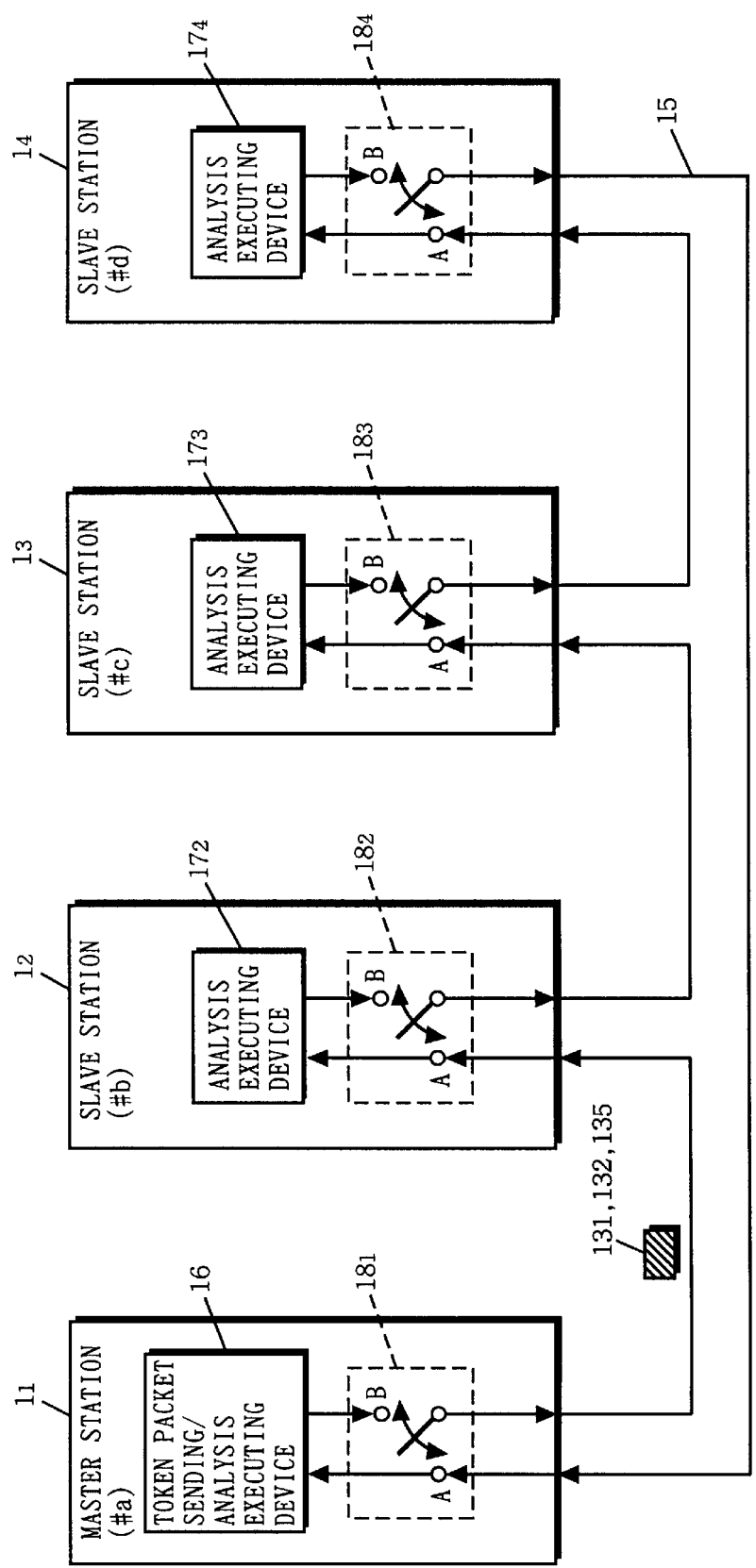
FIG. 10 illustrates the structure of a communication network according to a fourth embodiment of the present invention.

FIG. 10 illustrated the structure of a communication network according to a fourth embodiment of the present invention. The communication network shown in FIG. 10 has approximately the same structure as that shown in FIGS. 1 to 3. Therefore, in FIG. 10, the same reference numerals are assigned to structures corresponding to the structures shown in FIGS. 1 to 3 and hence, the description thereof is not repeated. That is, a master station $1_1$ shown in FIG. 10 comprises a table $16_1$, whose illustration is omitted, similarly to that shown in FIGS. 1 to 3.

Figure 11:
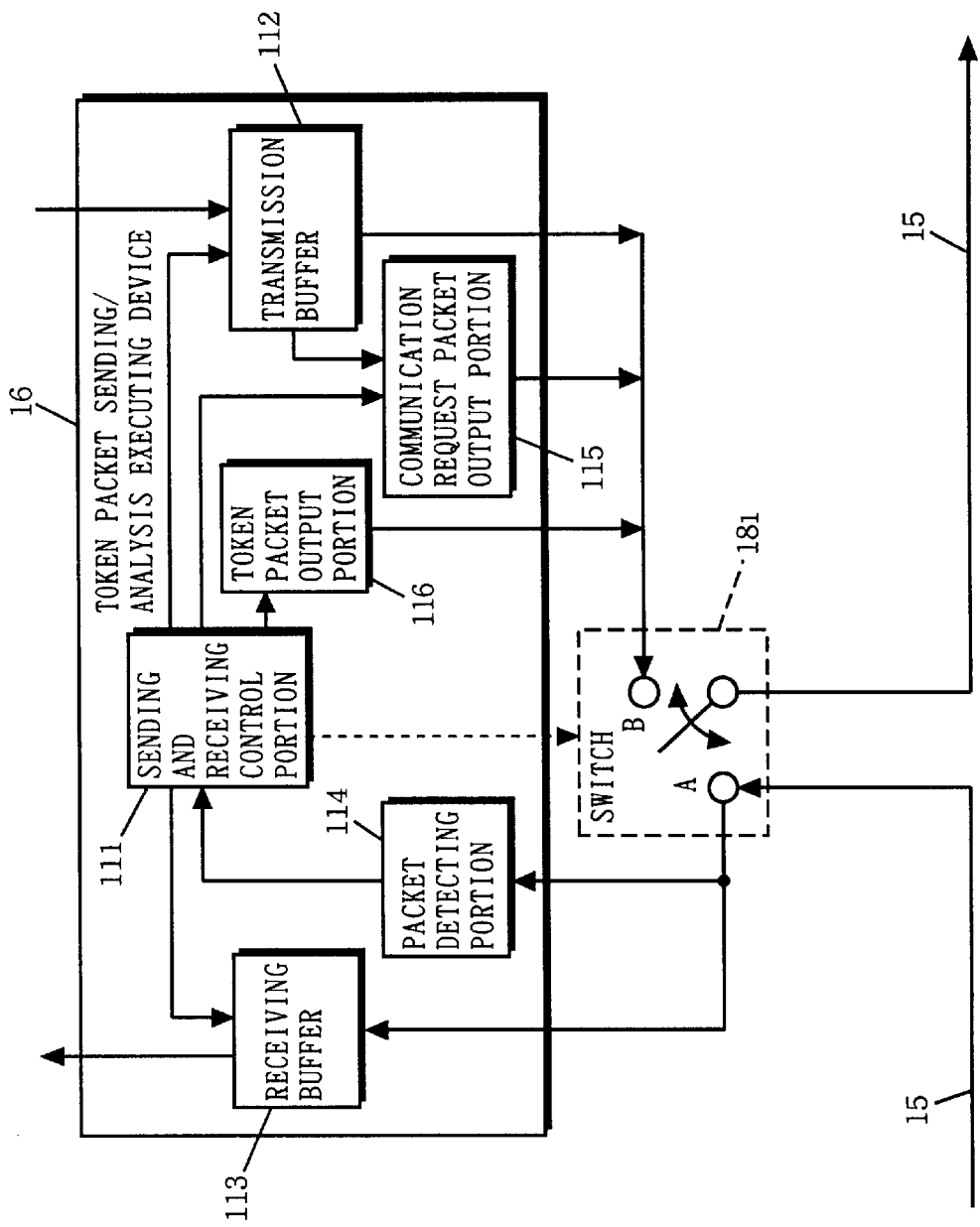
FIG. 11 is a block diagram showing the structures of a token packet sending/analysis executing device 16 and a switch $18_1$ in a master station $1_1$ shown in FIG. 10.
Figure 12:
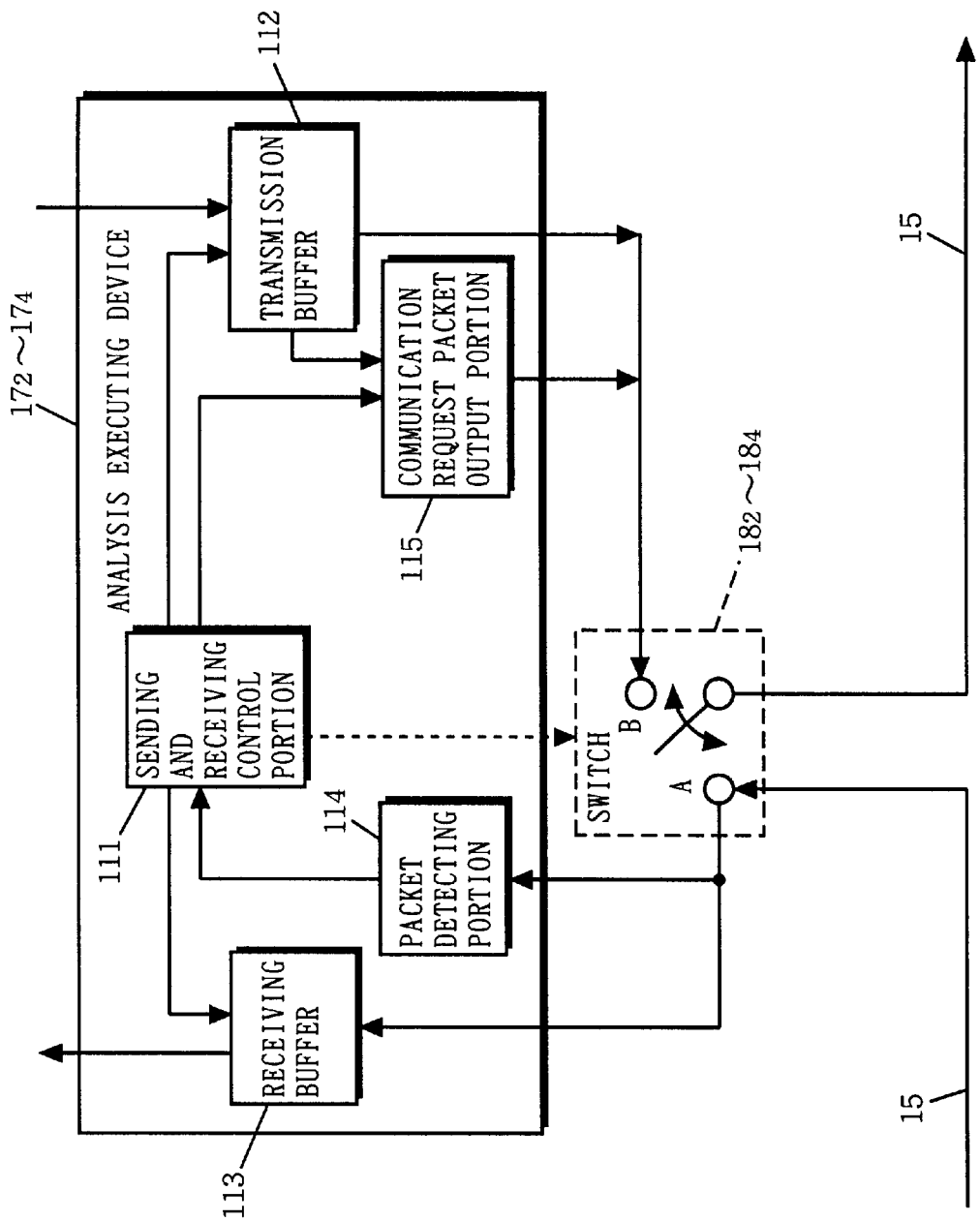
FIG. 12 is a block diagram showing the structures of analysis executing devices $17_2$ to $17_4$ and switches $18_2$ to $18_4$ in slave stations $1_2$ to $1_4$ shown in FIG. 10.

FIG. 11 is a block diagram showing the structures of a token packet sending/analysis executing device 16 and a switch $18_1$ in the master station $1_1$ shown in FIG. 10. FIG. 12 is a block diagram showing the structures of analysis executing devices $17_2$ to $17_4$ and switches $18_2$ to $18_4$ in slave stations $1_2$ to $1_4$ shown in FIG. 10. In FIGS. 11 and 12, each of the token packet sending/analysis executing device 16 and the analysis executing devices $17_2$ to $17_4$ comprises a sending and receiving control portion 111, a transmission buffer 112, a receiving buffer 113, a packet detecting portion 114, and a communication request packet output portion 115. Further, in FIG. 11, the token packet sending/analysis executing device 16 further comprises a token packet output portion 116. As apparent from comparison between FIGS. 11 and 12, the difference between the master station $1_1$ and the slave stations $1_2$ to $1_4$ is the presence or absence of the token packet output portion 116 and the table $16_1$.

Figure 13:
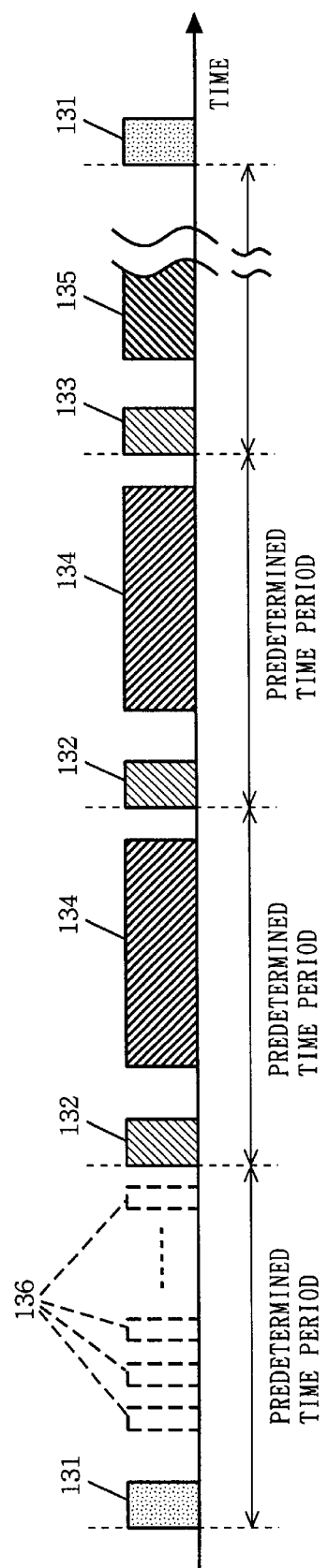
FIG. 13 is a diagram showing on a time base packets transmitted on a transmission path 15 in the communication network shown in FIG. 10.

FIG. 13 is a diagram showing on a time base packets transmitted on a transmission path 15 in the communication network shown in FIG. 10. In FIG. 13, an inquiry token packet 131, a token packet for asynchronous data 132, a token packet for isochronous data 133, a packet for asynchronous data 134, a packet for isochronous data 135, and a communication request packet (not shown) are transmitted to the transmission path 15 shown in FIG. 10. The token packet for asynchronous data 132 and the packet for asynchronous data 134 as well as the token packet for isochronous data 133 and the packet for isochronous data 135 are used in the case of asynchronous data communication and isochronous data communication described in the first embodiment and hence, the description thereof is simplified. The inquiry token packet 131 is a token packet for collecting communication requests of the respective stations 1, and a transmission bandwidth immediately after the inquiry token packet 131 is previously divided into a plurality of slots 136. Each of the stations 1 shown in FIG. 10 is previously assigned any one of the plurality of slots 136. Each of the stations 1 sends out the communication request packet to the slot assigned to itself.

The procedure for data communication in the communication network constructed as described above will be described.

The switch $18_1$ in the master station $1_1$ (see FIG. 11) and the switches $18_2$ to $18_4$ in the slave stations $1_2$ to $1_4$ (see FIG. 12) are in a state where the transmission path 15 is connected (on the side of terminals A) when the stations send out no packets. The switch $18_1$ in the master station $1_1$ and the switches $18_2$ to $18_4$ in the slave stations $1_2$ to $1_4$ disconnect the transmission path 15 (on the side of terminals B) only when the stations send out the packets (the packets other than the communication request packet), and connect the transmission path 15 again (on the side of the terminals A) immediately after packets which sent out by the station returns upon circulating around the transmission path 15. The basic operations are the same as those described in the first embodiment. As to the communication request packet, the stations $1_1$ to $1_4$ immediately return the switches $18_1$ to $18_4$, after sending out the communication request packet.

The token packet output portion 116 in the master station $1_1$ sends out to the transmission path 15 the token packet for asynchronous data 132 for establishing asynchronous data communication, the token packet for isochronous data 135 for establishing isochronous data communication, or the inquiry token packet 131 for each predetermined time period. Examples of a sequence of sending of tokens from the master station $1_1$ include a sequence for isochronous data communication and a sequence for asynchronous data communication. In the sequence for isochronous data communication, the token packet for isochronous data 135 is sent out. On the other hand, in the sequence for asynchronous data communication, the token packet for asynchronous data 132 or the inquiry token packet 131 is sent out.

In the case of the sequence for asynchronous data communication, the sending and receiving control portion 111 in the master station $1_1$ (see FIG. 11) connects the switch $18_1$ to the terminal B to disconnect the transmission path 15, and then sends out the produced inquiry token packet 131 (see FIG. 13) to the transmission path 15 from the token packet output portion 116. In each of the stations $1_1$ to $1_4$, the inquiry token packet 131 transmitted from the transmission path 15 on the upstream side is detected by the packet detecting portion 114. The sending and receiving control portion 111 in each of the stations $1_1$ to $1_4$ sends out, when the inquiry token packet 131 is detected, and when a communication request of asynchronous data to be transmitted is stored in the transmission buffer 112 in the station, a communication request packet representing the communication request of the asynchronous data from the communication request packet output portion 115 to the transmission path 15 on the downstream side using the slot for a communication request 136 previously assigned to the station. On the other hand, the sending and receiving control portion 111 in each of the stations $1_1$ to $1_4$ performs nothing or sends out, even when the inquiry token packet 131 is detected, and when a communication request of asynchronous data to be transmitted is not stored in the transmission buffer 112 in the station, a packet not representing the communication request of the asynchronous data to the transmission path 15 on the downstream side.

The packet detecting portion 114 in the master station $1_1$ detects that the inquiry token packet 131 returns upon circulating around the transmission path 15, and detects and analyzes the communication request packet transmitted immediately after the inquiry token packet 131. Consequently, the master station $1_1$ can receive the communication request packets in the stations 1 which are sent out to a plurality of slots for a communication request 136, and successively sends out, when there exits a station 1 which has sent a communication request, the token packet for asynchronous data 132 in which the station 1 which has sent a communication request is designated as a sending station to the transmission path 15 on the downstream side in the subsequent sequence for asynchronous data communication. The station 1 which has sent a communication request can send out asynchronous data stored in the transmission buffer 112 in the station using the token packet for asynchronous data 132. The master station $1_1$ sends out, after finishing outputting the token packets for asynchronous data 132 corresponding to all the stations 1 which has sent the communication request, the inquiry token packet 131 again. By repeating the foregoing operations, asynchronous data communication between the stations is established.

Figure 14:
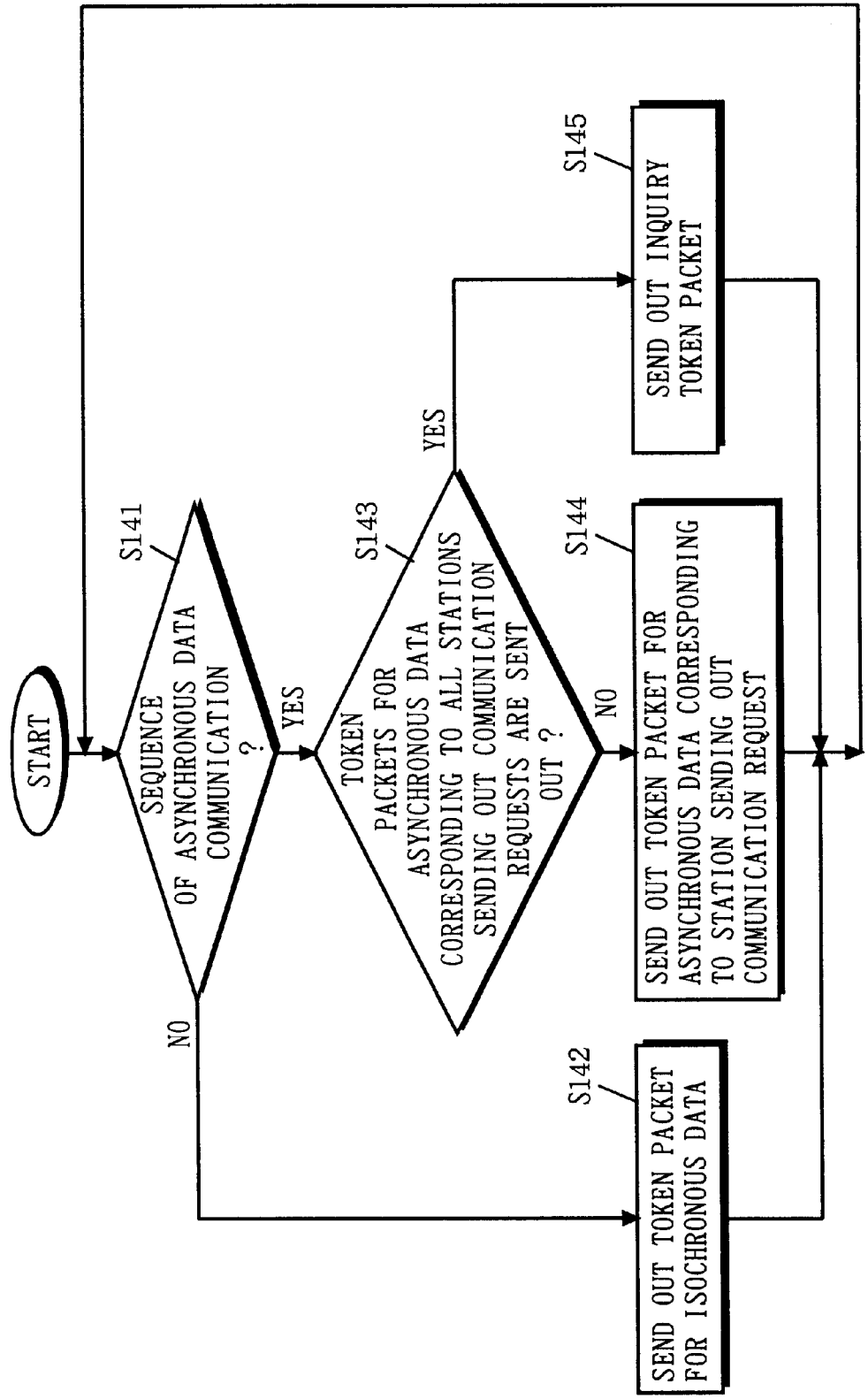
FIG. 14 is a flow chart showing the procedure that the master station $1_1$ sends out a token packet shown in FIG. 10.

FIG. 14 is a flow chart showing the procedure for sending of the token packets from the master station $1_1$ shown in FIG. 10. The master station $1_1$ judges whether or not a sequence to be currently established is a sequence for asynchronous data communication (step S141). In the case of the sequence for asynchronous data communication, there exists no station 1 which has sent the communication request in the initial state (step S143), so that the master station $1_1$ sends out the inquiry token packet 131 to the transmission path 15 on the downstream side in the above-mentioned procedure (step S145). Consequently, the master station $1_1$ can receive communication request packets in the stations 1 which are sent out to the slots for a communication request 136 in the above-mentioned procedure. The master station $1_1$ sends out, when there exits a station 1 sending out the communication request packet, the token packet for asynchronous data 132 in which the station 1 is designated as a sending station to the transmission path 15 in the subsequent sequence for asynchronous data communication (step S144). The master station $1_1$ sends out, when it finishes sending out the token packet for asynchronous data 132 in each of the stations 1 sending out the communication request packets, the inquiry token packet 131 again in the subsequent sequence for asynchronous data communication (step S145). The master station $1_1$ sends out the token packet for isochronous data 133 when a sequence to be currently established is not the sequence for asynchronous data communication in the step S141 (step S142). The master station $1_1$ repeats the procedure in the steps S141 to S145 described above. The master station $1_1$ sends out the inquiry token packet 131, the token packet for asynchronous data 132, or the token packet for isochronous data 133 for each predetermined time period, as described above.

Each of the stations 1 thus outputs the communication request packet to the assigned slot for a communication request 136, provided that it holds asynchronous data to be transmitted in response to the inquiry token packet 131 sent out by the master station $1_1$. The master station $1_1$ sends out the token packet for asynchronous data 132 in which the station 1 sending out the communication request packet is designated as a sending station in the subsequent sequence for asynchronous data communication. Consequently, the master station $1_1$ need not send out an unnecessary token packet for asynchronous data 132, and can reliably send out a token packet for asynchronous data in which the station 1 holding asynchronous data to be transmitted is designated as a sending station. This makes it possible to establish fair and efficient asynchronous data communication between the stations 1.

Each of the stations $1_1$ to $1_4$ designates an actual ID of the station 1 which should receive asynchronous data using the communication request packet sent out, making it possible for the master station $1_1$ to send out the token packet for asynchronous data 132 in which the station 1 designated by the actual ID is designated as a receiving station. Simultaneously, each of the stations $1_1$ to $1_4$ sends out an actual ID of the station when it sends out the communication request packet, also making it possible for the master station $1_1$ to easily send out the token packet for asynchronous data 132.

Furthermore, if information representing the amount of asynchronous data to be sent out and/or the priority of the asynchronous data to be sent out is added to the communication request packet sent out by each of the stations $1_1$ to $1_4$, the master station $1_1$ can send out the token packet for asynchronous data 132 corresponding to the amount and/or the priority held by each of the stations $1_1$ to $1_4$.

Fifth Embodiment

Figure 15:
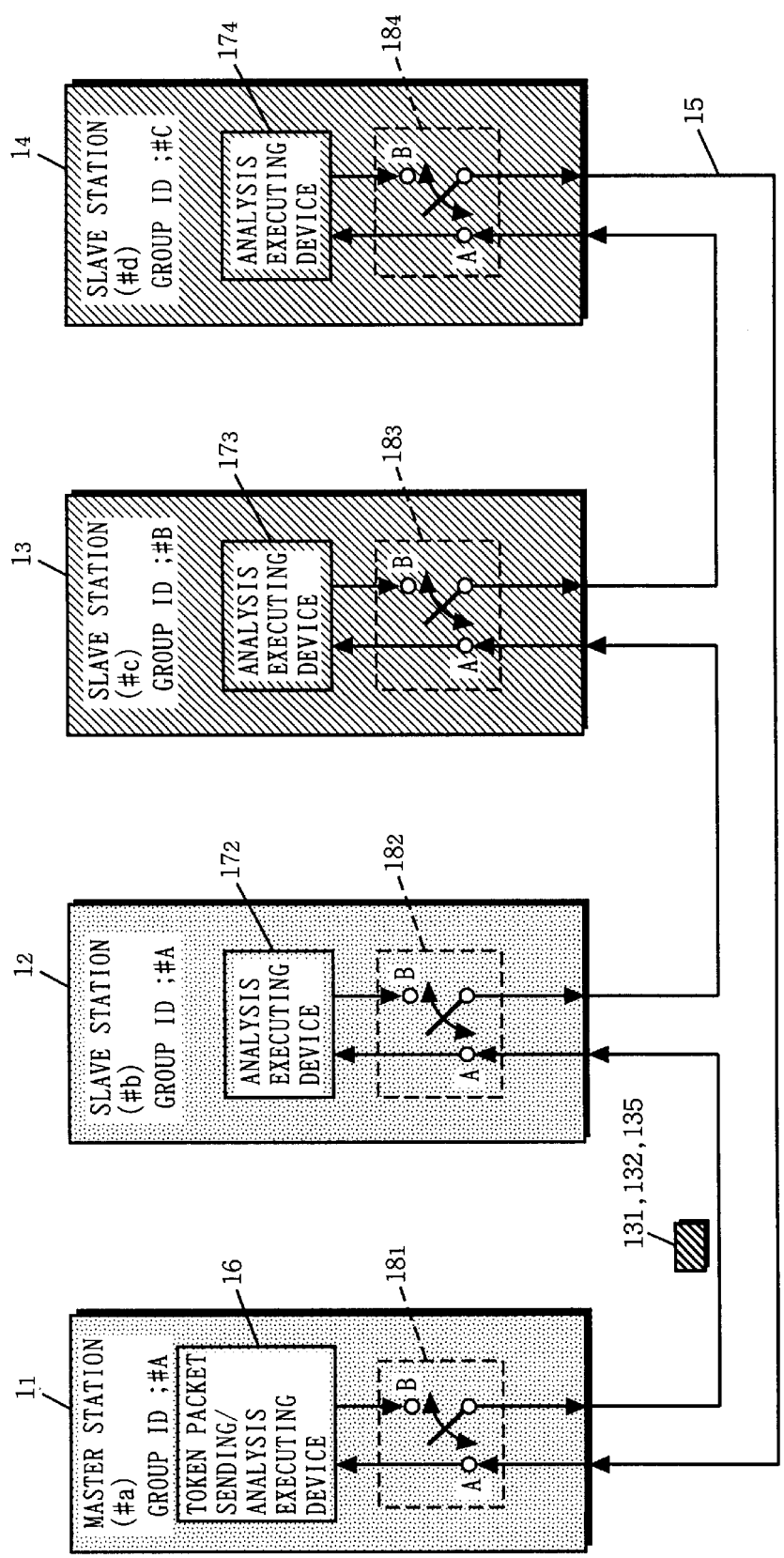
FIG. 15 illustrates the structure of a communication network according to a fifth embodiment of the present invention.

FIG. 15 illustrates the structure of a communication network according to a fifth embodiment of the present invention. The communication network according to the present embodiment has approximately the same structure as the communication network according to the fourth embodiment. Therefore, in the structure shown in FIG. 15, the same reference numerals are assigned to structures corresponding to the structures shown in FIG. 10 and hence, the description thereof is not repeated. That is, a master station $1_1$ shown in FIG. 15 comprises a table $16_1$, whose illustration is omitted, similarly to that shown in each of FIGS. 1 to 3, and a token packet sending/analysis executing device 161 in the master station has the same structure as that shown in FIG. 11. Slave stations $1_2$ to $1_4$ shown in FIG. 15 have the same structures as those shown in FIG. 12. Packets transmitted on a transmission path 15 in the communication network according to the fifth embodiment is the same as those shown in FIG. 13 if they are illustrated on a time base and hence, FIG. 13 will be incorporated in the following description.

The significant difference between the fifth embodiment and the fourth embodiment is that all the stations $1_1$ to $1_4$ are classified into a plurality of groups. More specifically, each of the stations $1_1$ to $1_4$ belongs to only one group, and is assigned a group ID for identifying the group to which the station itself belongs. In FIG. 15, it is assumed that the stations $1_1$ and $1_2$ belong to a group A (a group ID; #A), and the stations $1_3$ and $1_4$ belong to a group B (a group ID; #B).

The procedure of data communication in the communication network constructed as described above will be described. The procedure for data communication in the communication network according to the fifth embodiment is partially the same as the above-mentioned procedure for data communication in the communication network according to the fourth embodiment. Description is now made mainly with respect to the difference between them.

In the case of a sequence for asynchronous data communication, the master station $1_1$ sends out a produced inquiry token packet 131 (see FIG. 13) to the transmission path 15. A group ID; #A is set in the inquiry token packet 131 currently sent out. The stations $1_1$ to $1_4$ detect the inquiry token packet 131 transmitted from the transmission path 15. However, only the stations $1_1$ and $1_2$ receive, because the group ID designated by the currently detected inquiry token packet and the group ID of the stations identify with each other, the token packet. Each of the stations $1_1$ and $1_2$ sends out, provided that it receives the inquiry token packet 131, and it holds a communication request of asynchronous data to be transmitted, a communication request packet including the communication request of the asynchronous data and an actual ID of a station 1 which is a destination of transmission of the asynchronous data to the transmission path 15 using a slot 136 for a communication request packet assigned to the station (see FIG. 13).

The master station $1_1$ detects that the inquiry token packet 131 returns upon circulating around the transmission path 15, and receives a communication request packet transmitted immediately after the inquiry token packet 131. The master station $1_1$ successively sends out, provided that there exists a station 1 which has sent out a communication request of asynchronous data, a token packet for asynchronous data 132 in which a sending station and a receiving station are designated using actual IDs of the station 1 which has sent out the communication request of the asynchronous data and the station 1 which is a destination of transmission of the asynchronous data to the transmission path 15 in the subsequent sequence for asynchronous data communication. The station 1 which has sent the communication request can send out the asynchronous data held therein in response to the token packet for asynchronous data 132. The master station $1_1$ sends out token packets for asynchronous data 132 corresponding to all the stations 1 which has sent out communication requests.

In the subsequent sequence for asynchronous data, the master station $1_1$ sends out a newly produced inquiry token packet 131 (see FIG. 13) to the transmission path 15. A group ID; #B is set in the inquiry token packet 131 currently sent out. The stations $1_1$ to $1_4$ detect the inquiry token packet 131 transmitted from the transmission path 15. However, only the stations $1_3$ and $1_4$ receive, because the group ID designated by the currently detected inquiry token packet and the group ID of the stations identify with each other, the token packet. Each of the stations $1_3$ and $1_4$ sends out, provided that it receives the inquiry token packet 131, and it holds a communication request of asynchronous data to be transmitted, a communication request packet including the communication request of the asynchronous data and an actual ID of a station 1 which is a destination of transmission of the asynchronous data to the transmission path 15 using a slot for a communication request 136 assigned to the station (see FIG. 13). The subsequent procedure for communication is the same as that described above and hence, the description thereof is not repeated. The master station $1_1$ repeats the foregoing operations, whereby asynchronous data communication is performed.

Figure 16:
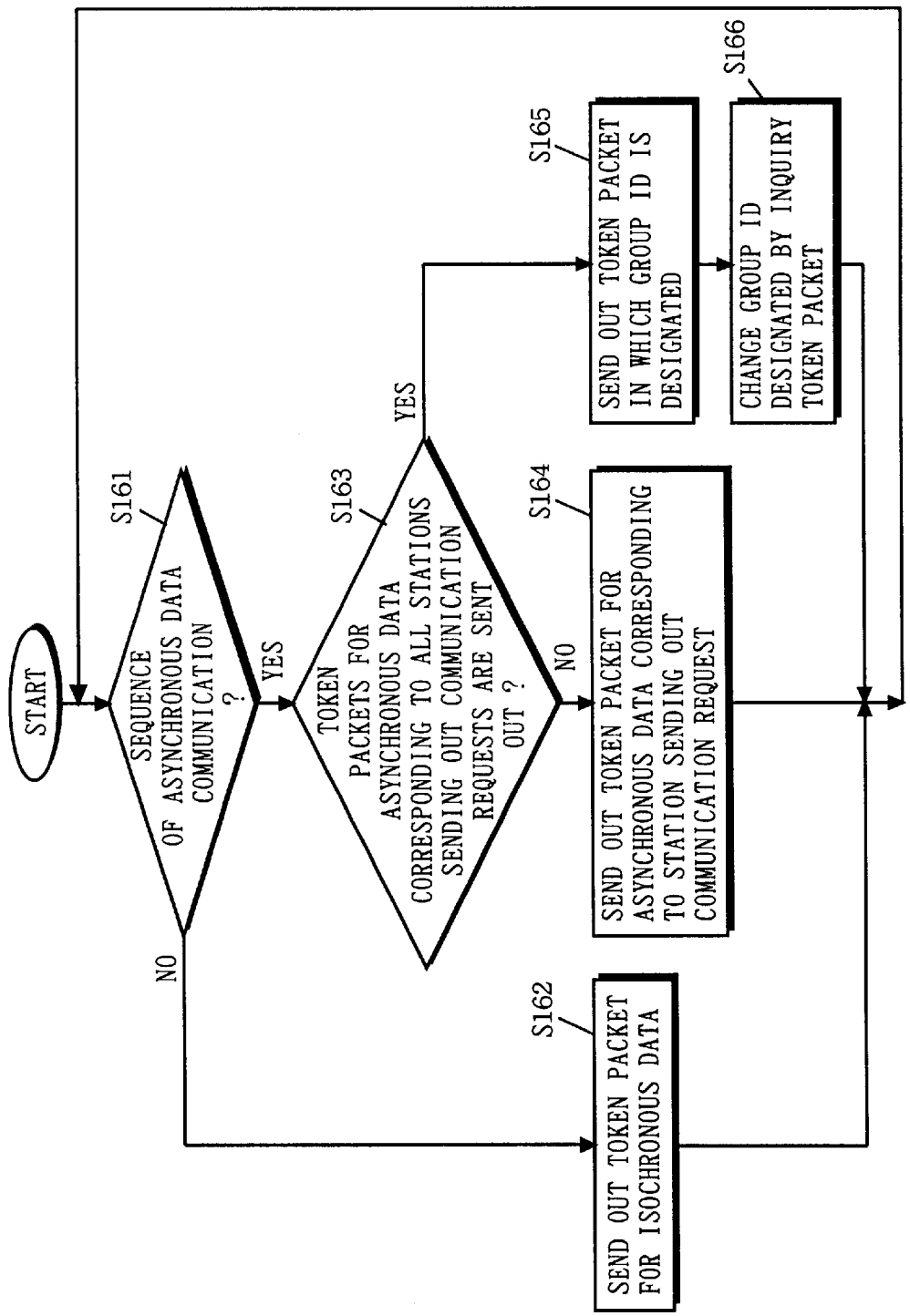
FIG. 16 is a flow chart showing the procedure that a master station $1_1$ sends out a token packet shown in FIG. 15.

FIG. 16 is a flow chart showing the procedure that the master station $1_1$ sends out the token packets shown in FIG. 15. The master station $1_1$ judges whether or not a sequence to be currently established is a sequence for asynchronous data communication (step S161). In the initial state of the sequence for asynchronous data communication, there exists no station 1 which has sent out a communication request (step S163), so that the master station $1_1$ sends our the inquiry token packet 131 in which the group ID; #A is designated to the transmission path 15 (step S165), and then changes the group ID to be designated by an inquiry token packet 131 to be subsequently sent out into #B (step S166). Consequently, the master station $1_1$ can receive communication request packets transmitted from the stations belonging to the group A (the stations $1_1$ and $1_2$) in the above-mentioned procedure. The master station $1_1$ sends out, when there exists a station 1 which has sent out the communication request packet, the token packet for asynchronous data 132 in which a sending station and a receiving station are designated to the transmission path 15 in the subsequent sequence for asynchronous data communication (step S164). The master station $1_1$ belongs to the group A, and sends out, when it finishes sending out the token packet for asynchronous data 132 in each of the stations 1 which have sent out communication request packets (step S163), the inquiry token packet 131 in which the group ID; #B is designated to the transmission path 15 (step S165). The designated group ID is changed every time when the inquiry token packet is sent out. Consequently, asynchronous data communication is established fairly for each group. The master station $1_1$ sends out the token packet for isochronous data 133 when a sequence to be currently established is not the sequence for asynchronous data communication in the step S161 (step S162). The master station $1_1$ repeats the procedure in the steps S161 to S166 as described above. The master station $1_1$ sends out the inquiry token packet 131, the token packet for asynchronous data 132, or the token packet for isochronous data 133 for each predetermined time period, as described above.

Each of the stations $1_1$ to $1_4$ can easily send out, in sending out the communication request packet, the token packet for asynchronous data 132 if it sends out an actual ID of the station together with the communication request packet because the master station $1_1$ can easily designate a sending station.

If information representing the amount of asynchronous data to be sent out and/or the priority of the asynchronous data to be sent out is added to the communication request packet sent out by each of the stations $1_1$ to $1_4$ to master station $1_1$ can send out the token packet for asynchronous data 132 corresponding to the amount and/or the priority held by each of the stations $1_1$ to $1_4$.

Sixth Embodiment

Figure 17:
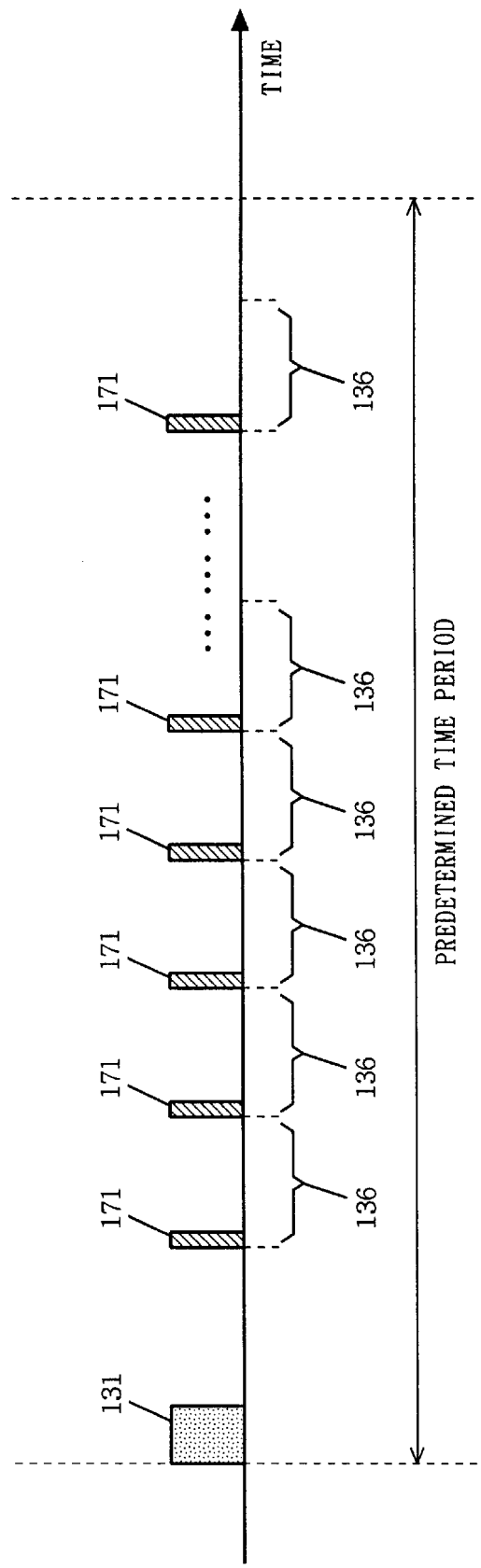
FIG. 17 illustrates on a time base an inquiry token packet 131 and identification signals 171 which are transmitted on a transition path 15 in a communication network according to a sixth embodiment.

A communication network according to a sixth embodiment has approximately the same structure as the communication network according to the fourth or fifth embodiment (see FIG. 10 or 15). In the above-mentioned fourth or fifth embodiment, the master station $1_1$ merely sends out an inquiry token packet 131, as shown in FIG. 13. In the sixth embodiment, however, a master station $1_1$ sends out an identification signal in order that each of stations 1 can easily identify the above-mentioned slot 136 after an inquiry token packet 131. FIG. 17 illustrates on a time base the inquiry token packet 131 and identification signals 171 which are transmitted on a transmission path 15 in the communication network according to the sixth embodiment. In FIG. 17, each of the identification signals 171 is sent out for the master station $1_1$ so as to represent the head of each of slots 136 subsequently to the inquiry token packet 131. Consequently, each of the stations 1 detects, when it detects the inquiry token packet 131, the identification signals 171 succeeding the inquiry token packet 131, so that a communication request packet (as described above) can be easily inserted into the slot 136 assigned to the station. Further, the master station $1_1$ also detects the identification signals 171 succeeding the inquiry token packet circulating around the transmission path 15, to recognize the communication request packet.

In the foregoing description, each of the identification signals 171 shall be sent out to the transmission path 15 so as to represent the head of each of the slots 136. However, it may represent the end of the slot for a communication request 136, in which case the same effect is obtained.

Although in the above-mentioned sixth embodiment, description was made of a communication network which is constituted by one loop, the sixth embodiment is also applicable in a communication network which is constituted by a plurality of loops.

Seventh Embodiment

Figure 18:
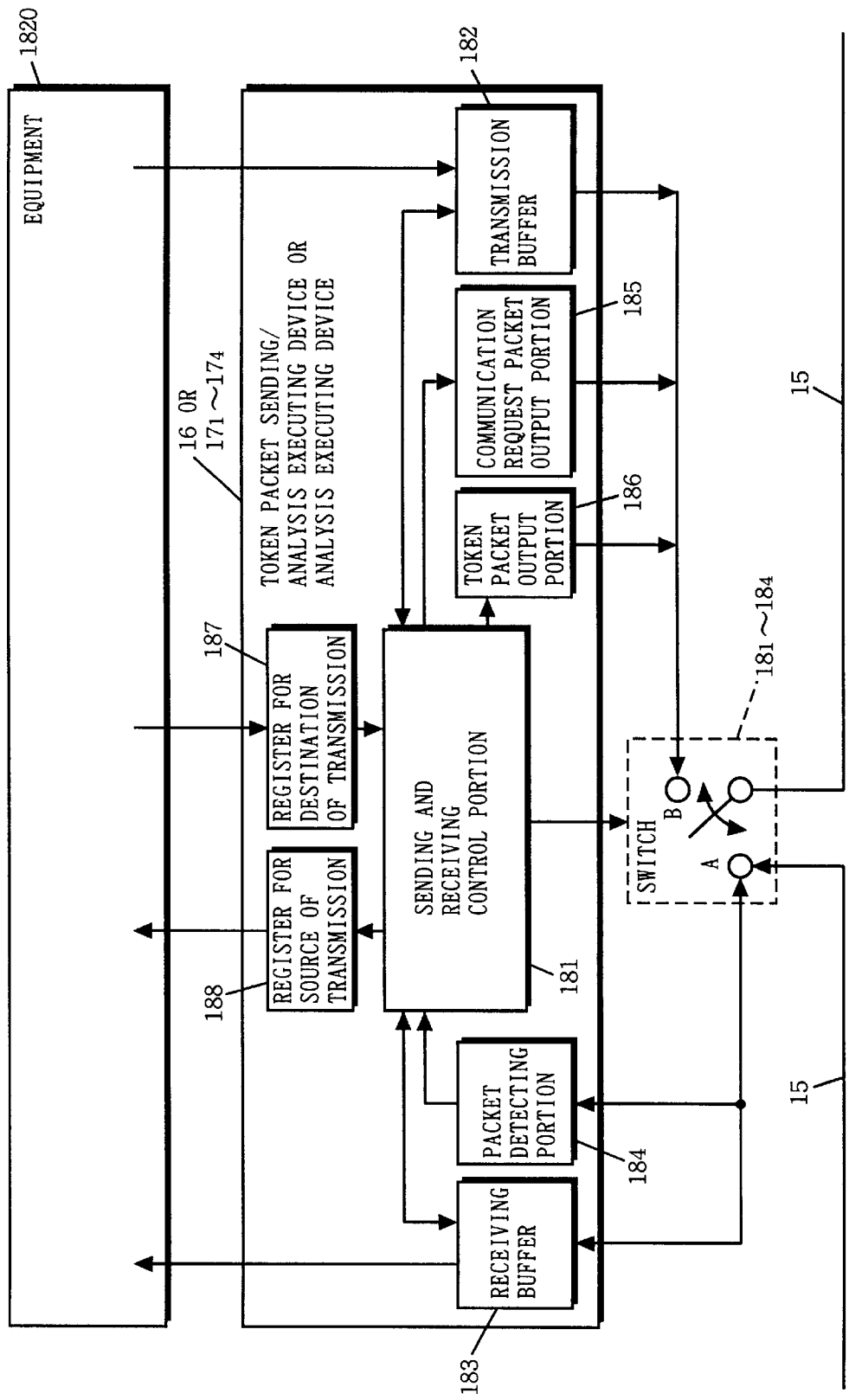
FIG. 18 is a block diagram showing the other structures of a token packet sending/analysis executing device 16 and a switch $18_1$ in a master station $1_1$ and analysis executing devices $17_2$ to $17_4$ and switches $18_2$ to $18_4$ in slave stations $1_2$ to $1_4$.

In the fourth embodiment, description was made of the structures of the token packet sending/analysis executing device 16 and the switch $18_1$ in the master station $1_1$ and the analysis executing devices $17_2$ to $17_4$ and the switches $18_2$ and $18_4$ in the slave stations $1_2$ to $1_4$ which reference to FIGS. 11 and 12. FIG. 18 is a block diagram showing the other structures of a token packet sending/analysis executing device 16 and a switch $18_1$ in a master station $1_1$ and analysis executing devices $17_2$ to $17_4$ and switches $18_2$ to $18_4$ in slave stations $1_2$ to $1_4$. In FIG. 18, the token packet sending/analysis executing device 16 comprises a sending and receiving control portion 181, a transmission buffer 182, a receiving buffer 183, a packet detecting portion 184, a communication request packet output portion 185, a token packet output portion 186, a register for a destination of transmission 187, and a register for a source of transmission 188. Each of the analysis executing devices $17_2$ to $17_4$ in the slave stations $1_2$ to $1_4$ differ from the token packet sending/analysis executing device 16 in the master station $1_1$ in that it does not comprise the token packet output portion 186 and a table $16_1$. In FIG. 18, structures corresponding to the structures shown in FIGS. 11 and 12 are assigned different reference numerals and the same names and hence, the description thereof is not repeated.

In transmitting asynchronous data, an equipment 1820 connected to the outside of the token packet sending/analysis executing device 16 or the analysis executing devices $17_2$ to $17_4$ write asynchronous data to be transmitted to the transmission buffer 182 and write an actual ID of a station to be a destination of transmission of the asynchronous data in the register for a destination of transmission 187. The sending and receiving control portion 181 in each of the stations sends out, after the asynchronous data to be transmitted and the actual ID of the station to be the destination of transmission start to be stored in the transmission buffer 182 and the register for a destination of transmission 187, a communication request packet to a transmission path 15 through the switch 18 in the station from the communication request packet output portion 186 in response to an inquiry token packet sent out by the master station $1_1$. Thereafter, the station 1 sends out the asynchronous data stored in the transmission buffer 182 to the transmission path 15 through the switch 18 in the station using a token packet for asynchronous data which is sent out by the master station $1_1$ and in which the station is designated as a sending station.

Furthermore, the asynchronous data is received by a token packet for asynchronous data which is sent out by the master station $1_1$ and in which the station is designated as a receiving station. The asynchronous data received by each of the stations is held once in the receiving buffer 183. When asynchronous data corresponding to one packet is held in the receiving buffer 183, an actual ID of a station transmitting the asynchronous data (a sending station) is stored in the register for a source of transmission 188. The equipment 1820 connected to the receiving station can read out, after the asynchronous data corresponding to one packet and the actual ID of the sending station are stored in the receiving buffer 183 and the register for a source of transmission 188, the received asynchronous data and the actual ID of the sending station.

In transmitting asynchronous data, the asynchronous data is thus stored in the transmission buffer 182, and an actual ID of a station which should receive the data (a receiving station) is stored in the register for a destination of transmission 187, after which each of the sending stations responds to the inquiry token packet sent out by the master station $1_1$. On the other hand, in receiving asynchronous data, the equipment 1820 can read out, when the received asynchronous data corresponding to one packet is stored in the receiving buffer 183, and the actual ID of the station which is a source of transmission of the data (a sending station) is stored in the register for a source of transmission 188, the asynchronous data and the actual ID. Consequently, it is possible to transmit the asynchronous data to each of the stations 1 and receive the asynchronous data from the station 1.

Eighth Embodiment

Figure 19:
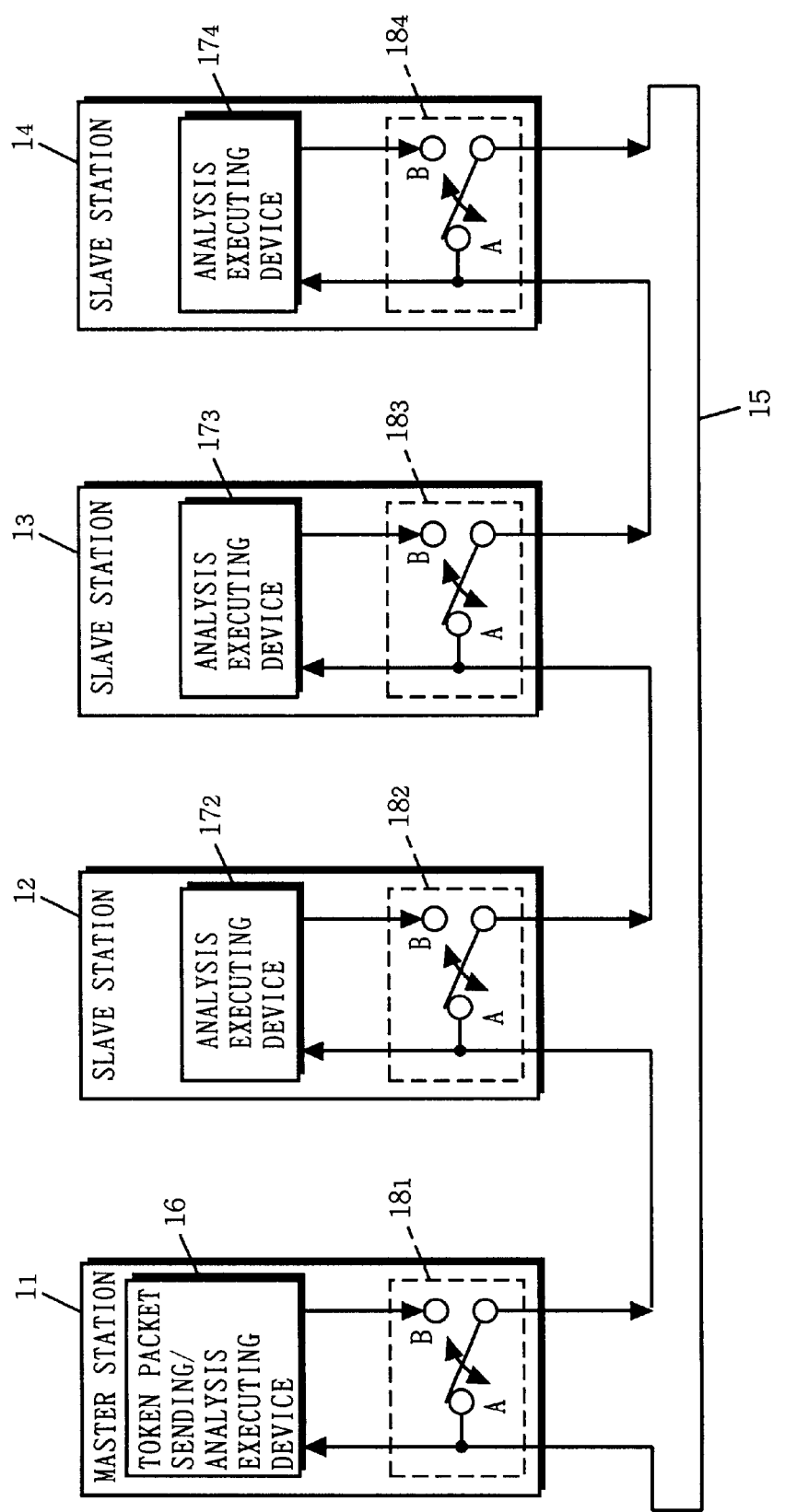
FIG. 19 illustrates the structure of a communication network according to an eighth embodiment of the present invention.

FIG. 19 illustrates the structure of a communication network according to an eighth embodiment of the present invention. In FIG. 19, a plurality of stations (four stations $1_1$ to $1_4$ are illustrated) are connected so as to be capable of communicating with each other by a loop-shaped transmission path 15. Further, the station $1_1$ functions as a master station, and the other stations $1_2$ and $1_4$ function as slave stations (which are hereinafter referred to as the master station $1_1$ and the slave stations $1_2$ to $1_4$). The master station $1_1$ comprises a token packet sending/analysis executing device 16 and a switch $18_1$. The slave stations $1_2$ to $1_4$ comprise analysis executing devices $17_2$ to $17_4$ and switches $18_2$ and $18_4$. The procedure for automatically setting an actual ID in each of the stations 1 accommodated in the network in the communication network constructed as above will be described with reference to FIGS. 20 to 28.

Figure 20:
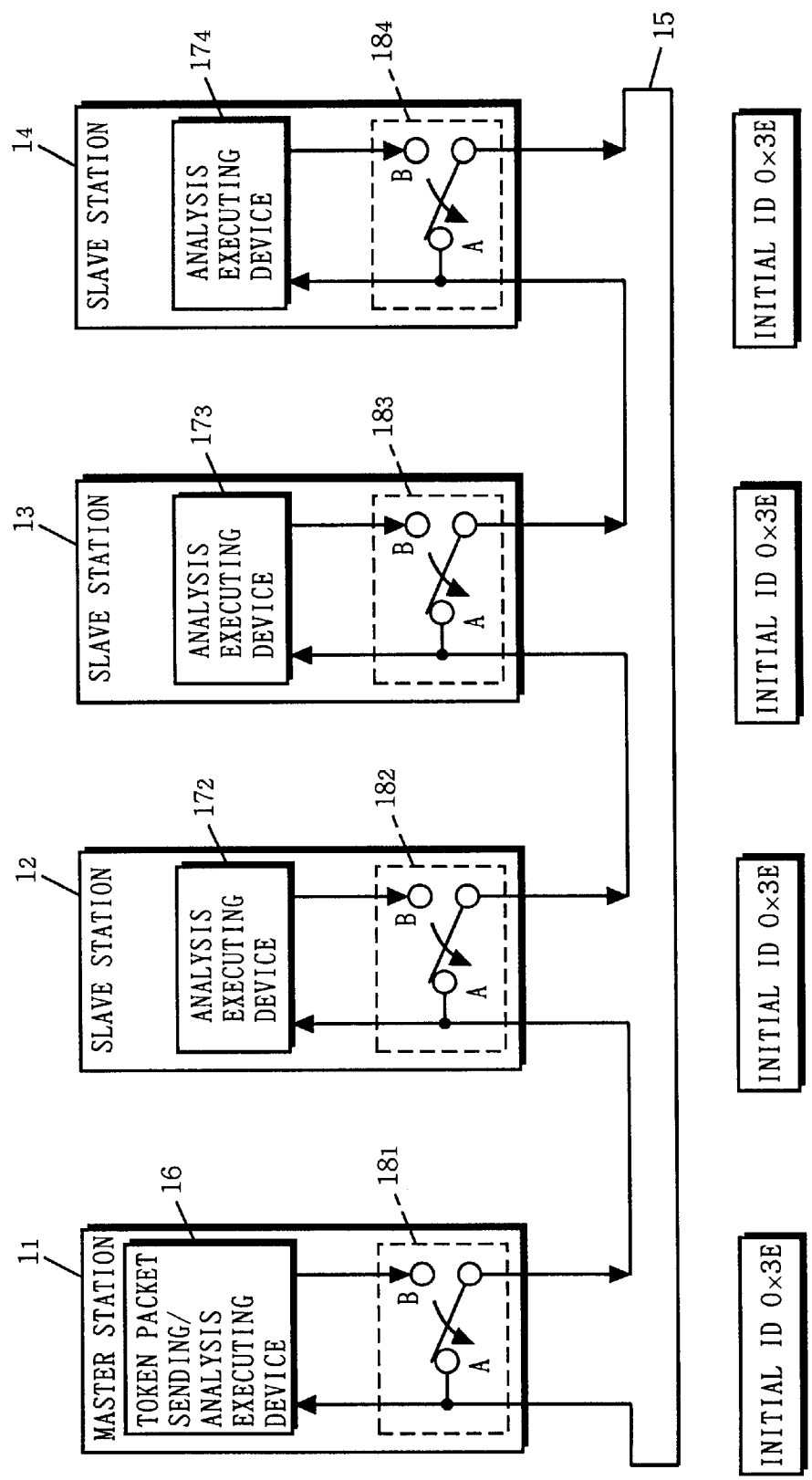
FIGS. 20 to 27 are diagrams for explaining the procedure for automatically setting an actual ID in each station 1 in the communication network shown in FIG. 19.

First, FIG. 20 illustrates the initial state such as the time of turning on the power supply of the communication network according to the present embodiment. In the initial state, "0x3E" is set as initial IDs in the stations $1_1$ to $1_4$, and the switches $18_1$ to $18_4$ are further connected to terminals $A_1$ respectively. The initial IDs are identifiers which are common among the stations 1 in the communication network. The common initial ID need not be necessarily set in the master station $1_1$, and the actual ID (for example, "0x00") may be set from the beginning, unlike the other slave stations $1_2$ to $1_4$.

Figure 21:
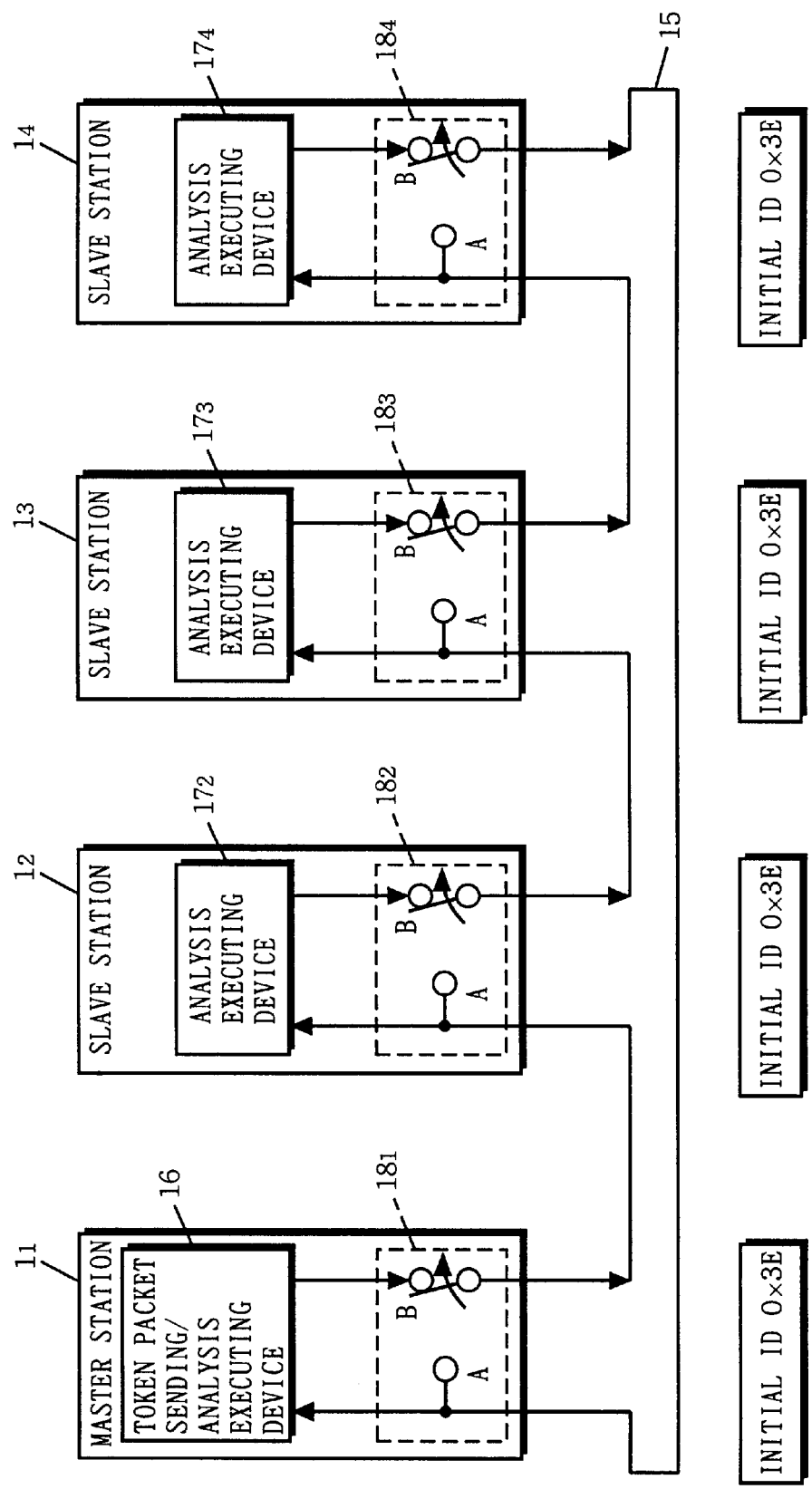

The master station $1_1$ first procedures a token packet for switching using the token packet sending/analysis executing device 16, and sends out the token packet to a transmission path 15 upon connecting the switch $18_1$ to a terminal B. In the token packet for switching, a station to be a source of transmission of data (a sending station) and a station to be a destination of transmission of the data (a receiving station) are designated using the initial ID ("0x3E"). Therefore, the station 1 having the initial ID on the transmission path 15 connects the switch 18 (switches $18_1$ to $18_4$ in all the station $1_1$ to $1_4$ in this description) to the terminal B in an attempt to transmit a data packet, as shown in FIG. 21. The process is hereinafter referred to as a switching process. The master station $1_1$ must connect, when it is assigned the actual ID from the beginning, the switch $18_1$ in the station to the terminal B after sending the token packet for switching and receiving the sent token packet which circulated.

Figure 22:
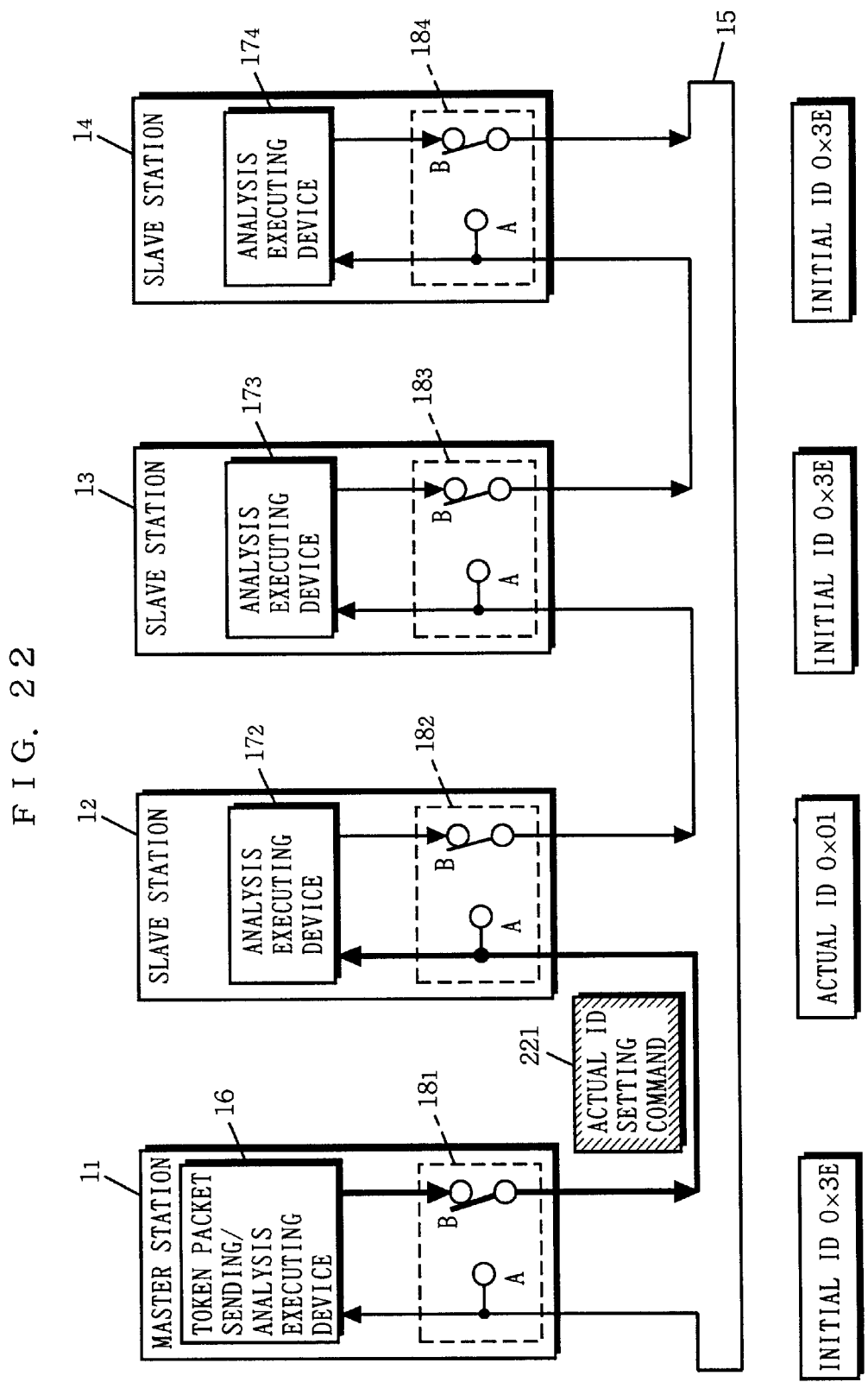

By the switching process, the master station $1_1$ sends out an actual ID setting command 221 to the transmission path 15 as one type of data packet as shown in FIG. 22 while the switches $18_1$ to $18_4$ in all the stations $1_1$ to $1_4$ are connected to the terminals B. The actual ID setting command 221 is sent out in order to set the actual ID of a receiving station to "0x01". Since all the stations $1_1$ to $1_4$ on the transmission path 15 are designated as receiving stations, and all the switches $18_1$ to $18_4$ are connected to the terminals B, the actual ID setting command currently sent out is received only by the slave station $1_2$ which is a station subsequent to the master station $1_1$, not to be transmitted to the stations 1 on the downstream side of the slave station $1_2$. Consequently, only the slave station $1_2$ performs processing conforming to the received actual ID setting command 221, so that "0x01" is fixedly set therein as an actual ID (see FIG. 22). A process as shown in FIG. 22 is hereinafter referred to as an actual ID setting command sending process. The station 1 in which the switch 18 is connected to the terminal B using the current token packet for switching (all the station $1_1$ to $1_4$ in this description) connects the switch 18 to the terminal A after an elapse of a predetermined time period.

The master station $1_1$ sends out the actual ID setting command 221, and then judges whether or not the actual ID setting command 221 returns again upon circulating around the transmission path 15. Since the actual ID setting command is not transmitted to the stations 1 on the downstream side of the slave station $1_2$, it is not returned to the master station $1_1$. The master station $1_1$ considers, when the actual ID setting command 221 sent out by itself does not return within a predetermined time period, that the actual ID setting command 221 is received by any one of the slave stations $1_2$ to $1_4$, and waits for an actual ID setting acknowledgment transmitted from the slave station 1. In the case, the master station $1_1$ designates a sending station using the actual ID ("0x01") and sends out a token packet for asynchronous data in which the master station $1_1$ is designated as a receiving station to the transmission path 15 in order that the slave station 1 in which the actual ID is set can transmit the actual ID setting acknowledgment. In the token packet for asynchronous data, when the master station $1_1$ has an initial ID ("0x3E") which is common to those of the slave stations $1_2$ to $1_4$, the master station $1_1$ may be designated as a receiving station using the common initial ID. On the other hand, when the master station $1_1$ has an actual ID from the beginning, the master station $1_1$ may be designated as a receiving station using the actual ID ("0x00").

The slave station $1_2$ in which the actual ID ("0x01") is set sends out, when data transmission is enabled by a token packet for asynchronous data, an actual ID setting acknowledgment indicating that the actual ID is correctly set as a data packet. The actual ID setting acknowledgment is received by the station 1 having an initial ID "0x3E" or an actual ID "0x00". Although the actual ID setting acknowledgment is also received, when the master station $1_1$ has the common initial ID, by the other slave station 1 having the other initial ID (the slave stations $1_3$ and $1_4$ at the present time point), the contents thereof exert no adverse effect because they are interpreted only by the master station $1_1$. When the master station $1_1$ receives the actual ID setting acknowledgment from the slave station $1_2$ as described above, it is recognized that the actual ID "0x01" is correctly set in any one of the slave stations 1. This process is hereinafter referred to as an actual ID confirmation process. The master station $1_1$ recognizes, when it does not receive the actual ID setting acknowledgment, that the actual ID is to correctly set in any of the slave stations 1. In this case, the above-mentioned switching process to the actual ID confirmation process are repeated in the communication network.

When the master station $1_1$ receives the above-mentioned actual ID setting acknowledgment, the subsequent switching process is carried out in the communication network. The master station $1_1$ first determines an actual ID to be currently set. The actual ID to be currently set is so selected as not to be overlapped with the actual ID previously set ("0x01"). For example, the master station $1_1$ increments the actual ID previously set, to select the actual ID to be currently set. By following this selecting method, the actual ID to be subsequently set is "0x02".

Figure 23:
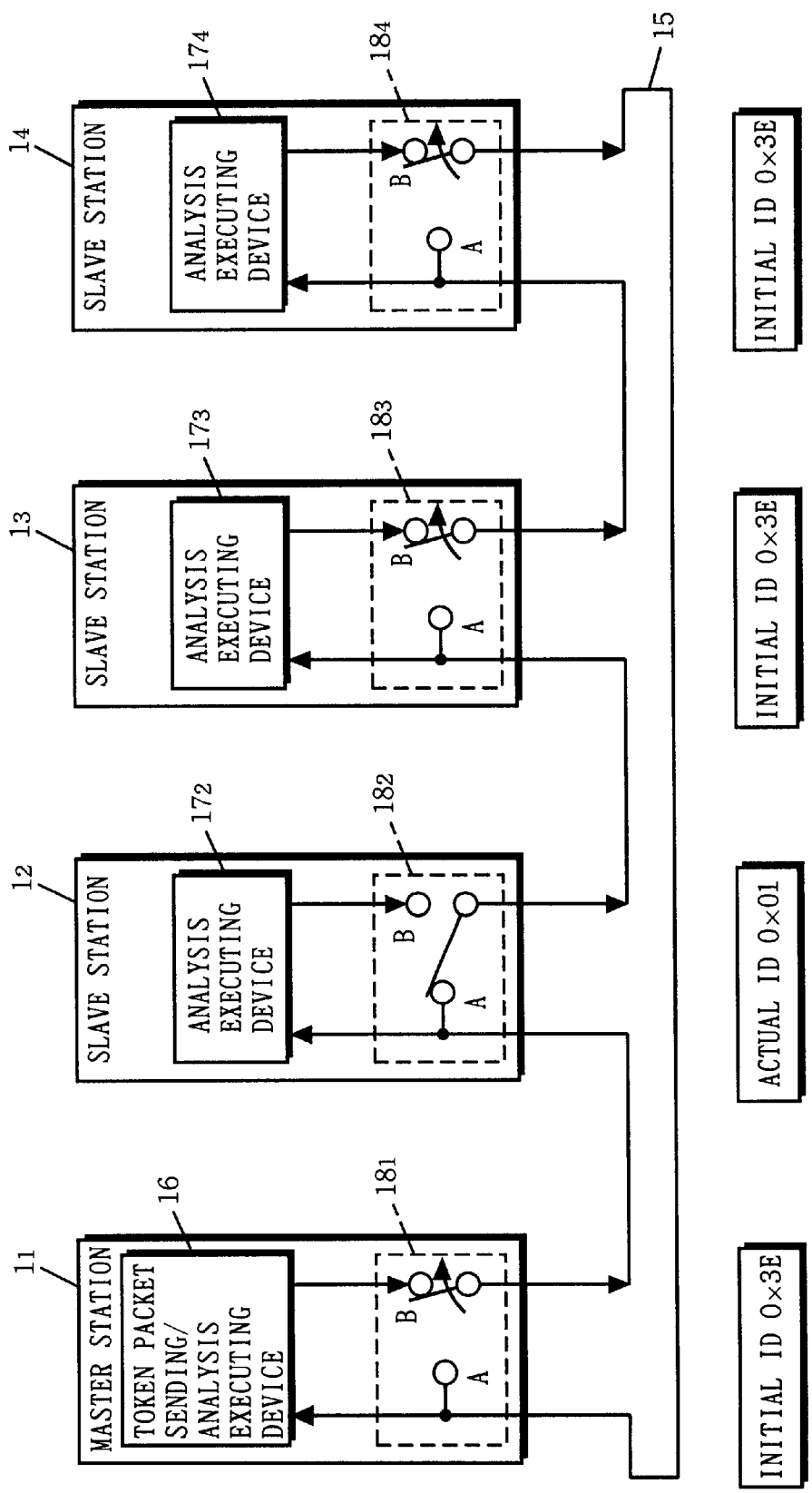

The master station $1_1$ produces the same token packet for switching as described above, and sends out the produced token packet to the transmission path 15 after selecting the actual ID. Also in the current token packet for switching, both a sending station and a receiving station are designated using the initial ID ("0x3E"). Therefore, the switch 18 in the station 1 having the initial ID (the switches $18_1$, $18_3$ and $18_4$ in the stations $1_1$, $1_3$ and $1_4$ in this description) on the transmission path 15 is connected to the terminal B, as shown in FIG. 23. The switch $18_2$ in the station $1_2$ remains connected to the terminal A because the actual ID is set therein.

Figure 24:
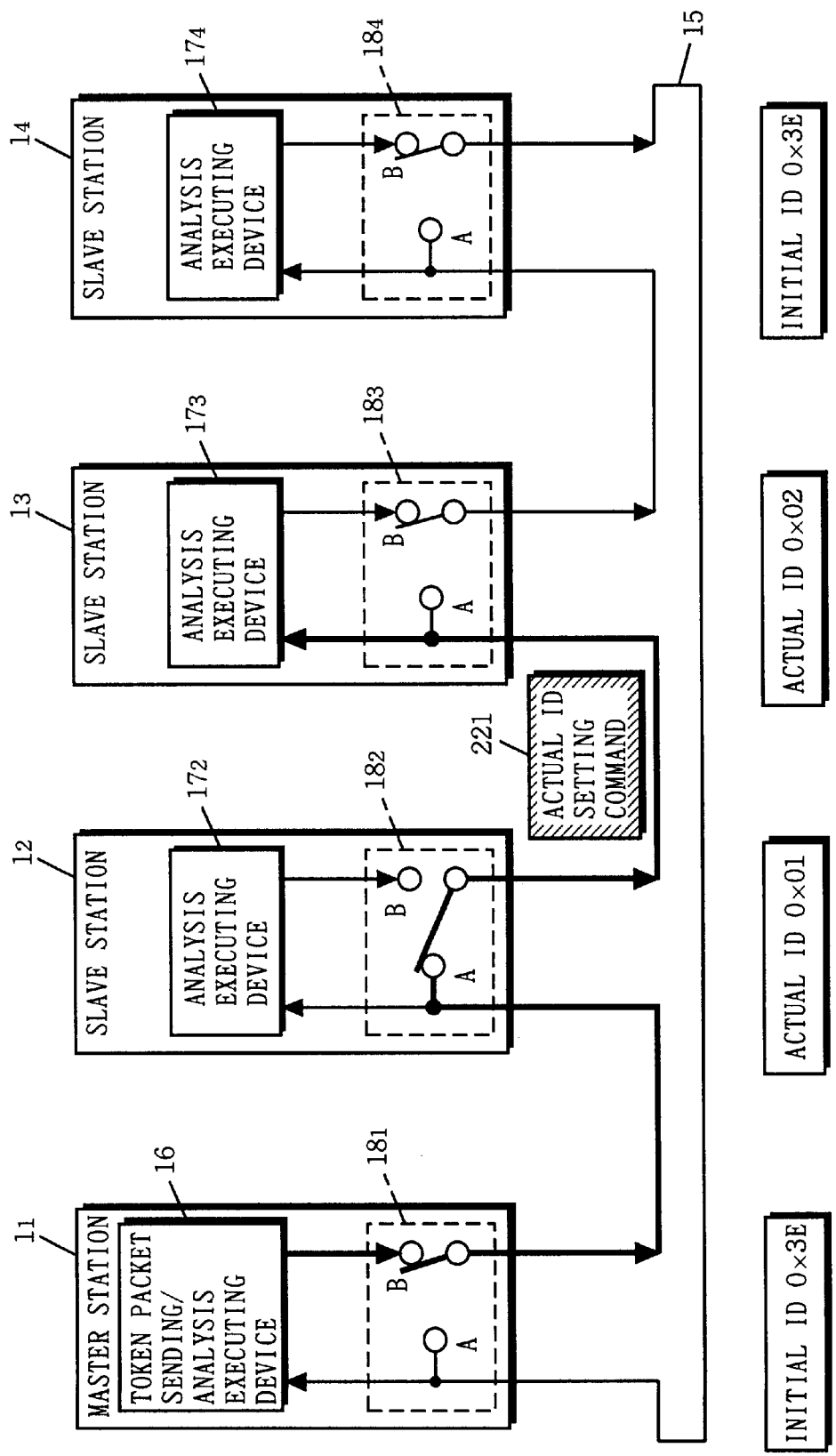

While the switches $18_1$, $18_3$ and $18_4$ in the stations $1_1$, $1_3$ and $1_4$ are connected to the terminals B by the switching process, the master station $1_1$ sends out the actual ID setting command 221 to the transmission path 15, as shown in FIG. 24. The current actual ID setting command 221 is sent out in order to set an actual ID of a predetermined receiving station to "0x02". Since the stations $1_1$, $1_3$ and $1_4$ on the transmission path 15 are designated as receiving stations, and the switch $18_2$ is connected to the terminal $A_1$ the actual ID setting command 221 currently sent out is received only by the slave station $1_3$ through the slave station $1_2$, not to be transmitted to the stations 1 on the downstream side of the slave station $I_3$. Consequently, only the slave station $1_3$ performs processing conforming to the received actual ID setting command 221, so that "0x02" is fixedly set therein as an actual ID (see FIG. 24). The station 1 in which the internal switch 18 is connected to the terminal B using the current token packet for switching (the stations $1_1$, $1_3$ and $1_4$ in this description) connects the switch 18 to the terminal A after an elapse of a predetermined time period.

The master station $1_1$ judges whether or not the actual ID setting command sent out by itself returns upon circulating around the transmission path 15. Since the current actual ID setting command does not return, however, the master station $1_1$ waits for the actual ID setting acknowledgment transmitted from the slave station 1 receiving the actual ID setting command. In the case, the master station $1_1$ designates a sending station using the actual ID ("0x02") in order that the slave station 1 in which the actual ID is currently set can transmit the actual ID setting acknowledgment, and sends out to the transmission path 15 the token packet for asynchronous data in which the master station $1_1$ is designated as a receiving station.

The slave station $1_3$ in which the actual ID ("0x02") is set sends out, when data transmission is enabled by the token packet for asynchronous data, the actual ID setting acknowledgment as a data packet. The actual ID setting acknowledgment is received and interpreted only by the master station $1_1$ as described above, so that it is recognized that the actual ID "0x02" is correctly set in any one of the slave stations 1 (an actual ID confirmation process). When the master station $1_1$ does not receive the actual ID setting acknowledgment as described above, the above-mentioned switching process to the actual ID confirmation process are repeated in the communication network.

When the master station $1_1$ receives the above-mentioned actual ID setting acknowledgment, the subsequent switching process to the actual ID confirmation process are carried out in the communication network. The master station $1_1$ first determines an actual ID to be currently set. The actual ID to be currently set is so selected as not to be overlapped with the actual IDs ("0x01" and "0x02") previously set. The master station $1_1$ increments the actual ID "0x02" previously set, for example, to select an actual ID "0x03" to be currently set. As apparent from the foregoing, the actual ID "0x03" is fixedly set in the slave station $1_4$.

When the master station $1_1$ receives the above-mentioned actual ID setting acknowledgment, the subsequent switching process to the actual ID confirmation process are carried out in the communication network. The master station $1_1$ first determines an actual ID to be currently set. The actual ID to be currently set is so selected as not to be overlapped with the actual IDs ("0x01", "0x02" and "0x03") previously set. For example, the master station $1_1$ increments the actual ID "0x03" previously set, to select an actual ID "0x04" to be currently set.

Figure 25:
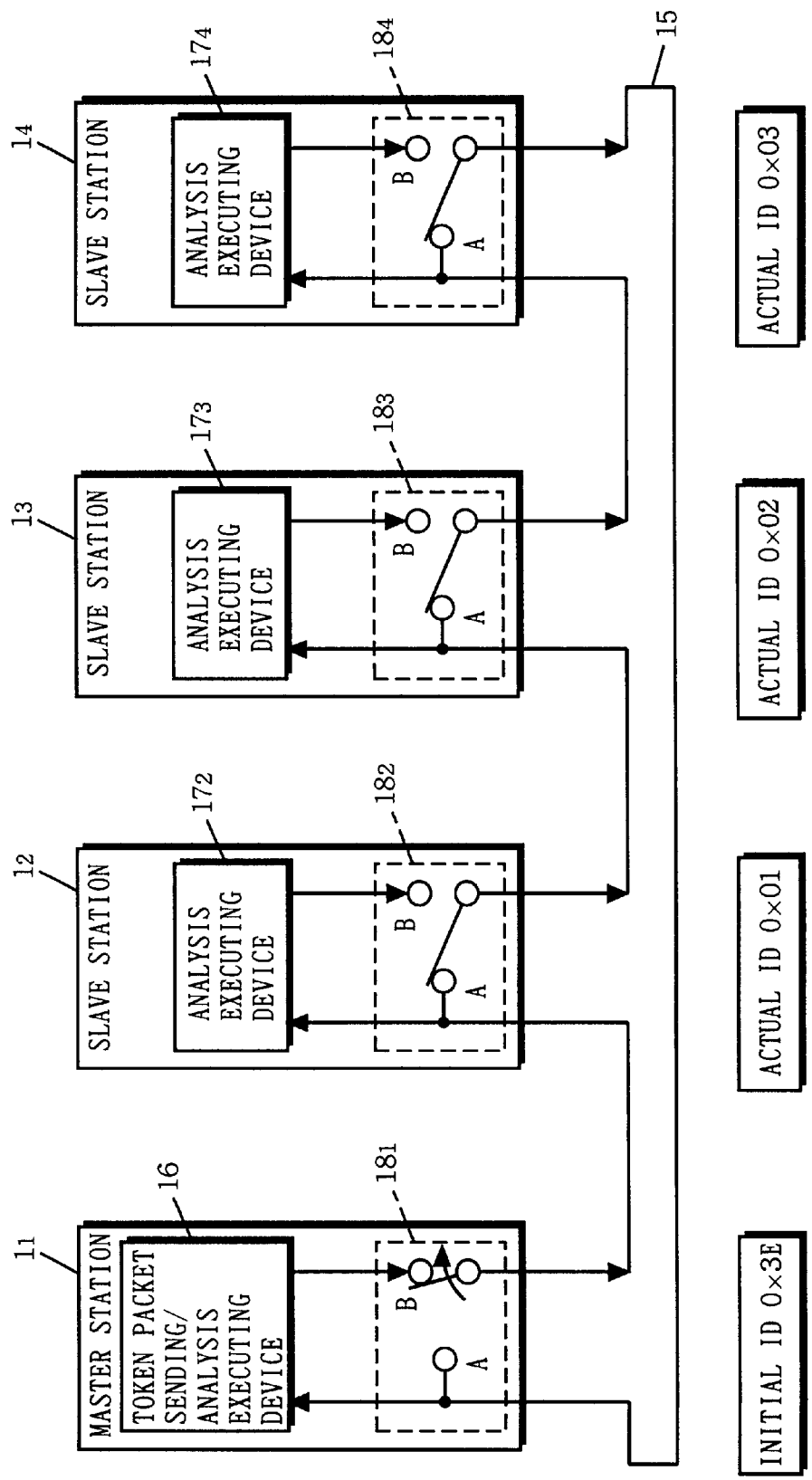

The master station $1_1$ produces the same token packet for switching as described above, and sends out the produced token packet to the transmission path 15 after selecting the actual ID to be currently set. Also in the current token packet for switching, both a sending station and a receiving station are designated using an initial ID ("0x3E"). Therefore, the switch 18 in the station 1 having the initial ID (the switch $18_1$ in the station $1_1$ in this description) on the transmission path 15 is connected to the terminal B, as shown in FIG. 25. The switches $18_2$ and $18_4$ in the stations $1_2$ to $1_4$ remain connected to the terminals A because the actual IDs are set therein.

Figure 26:
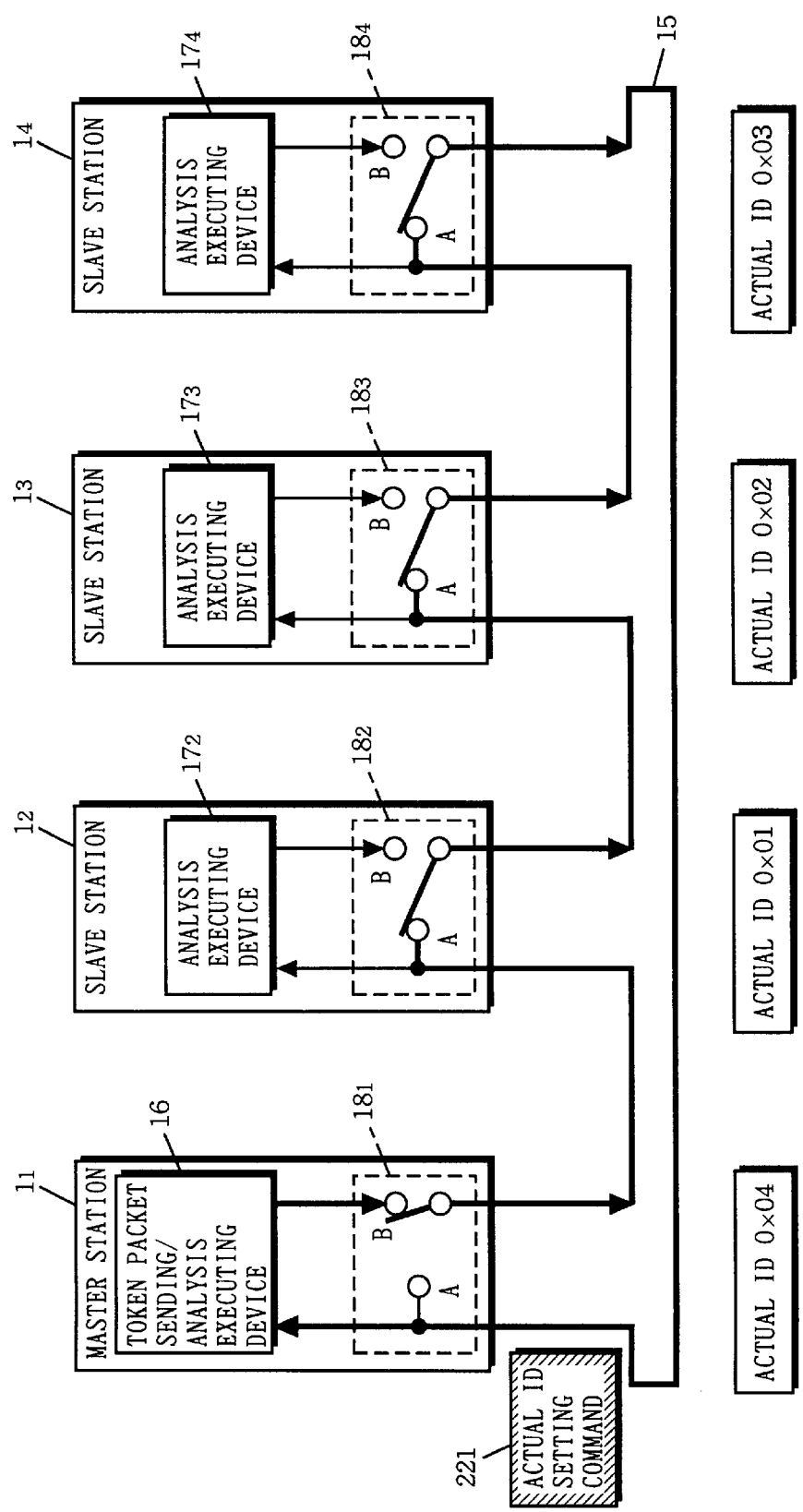
Figure 27:
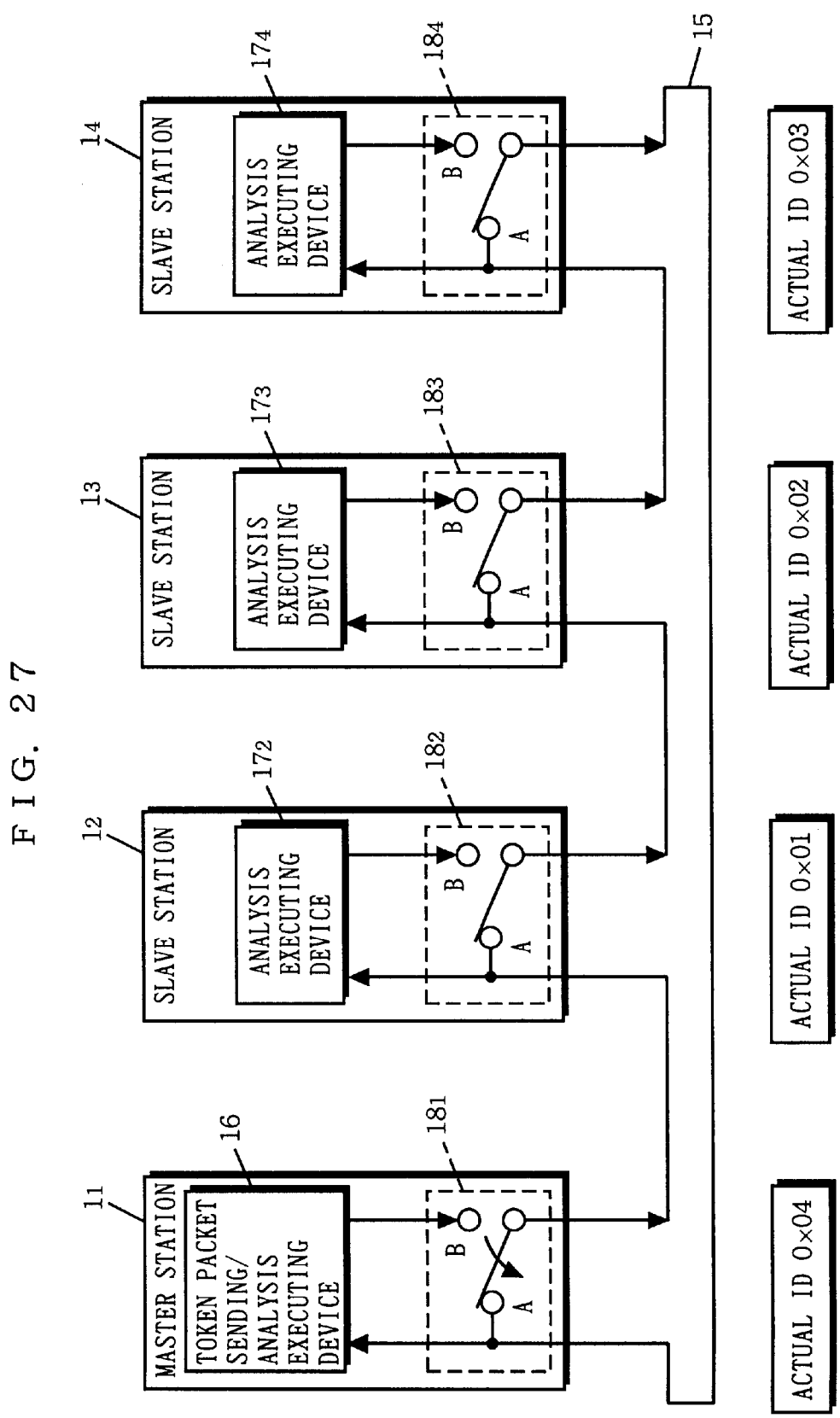

While the switch $18_1$ in the station $1_1$ is connected to the terminal B by the switching process, the master station $1_1$ sends out the actual ID setting command 221 to the transmission path 15, as shown in FIG. 26. The actual ID setting command 221 is sent out in order to set an actual ID of a predetermined receiving station to "0x04". Since the station $1_1$ on the transmission path 15 is designated as a receiving station, and the switches $18_2$ and $18_4$ are connected to the terminals A, the actual ID setting command 221 currently sent out is received only by the master station $1_1$ through the slave stations $1_2$ to $1_4$. Consequently, only the master station $1_1$ performs processing conforming to the received actual ID setting command 221, so that "0×04" is fixedly set therein as an actual ID (see FIG. 26). The station 1 in which the switch 18 is connected to the terminal B using the current token packet for switching (the station $1_1$ in this description) connects the switch 18 to the terminal A after an elapse of a predetermined time period.

The master station $1_1$ judges whether or not the actual ID setting command 221 sent out by itself is returned upon circulating around the transmission path 15. The master station $1_1$ recognizes that the actual IDs are fixedly set in all the stations 1 accommodated in the communication network because the current actual ID setting command 221 returns, to complete the setting of the actual IDs (see FIG. 27). In the communication network, isochronous data communication or the like described in the first embodiment, for example, will be thereafter established.

As described in the foregoing, if the token packet for switching and the actual ID setting command are repeatedly transmitted, it is possible to automatically set the actual IDs in the stations from the station subsequent to the master station $1_1$ to the station on the downstream side (the slave stations $1_2$, $1_3$ and $1_4$ and the master station $1_1$ in this order).

Figure 28:
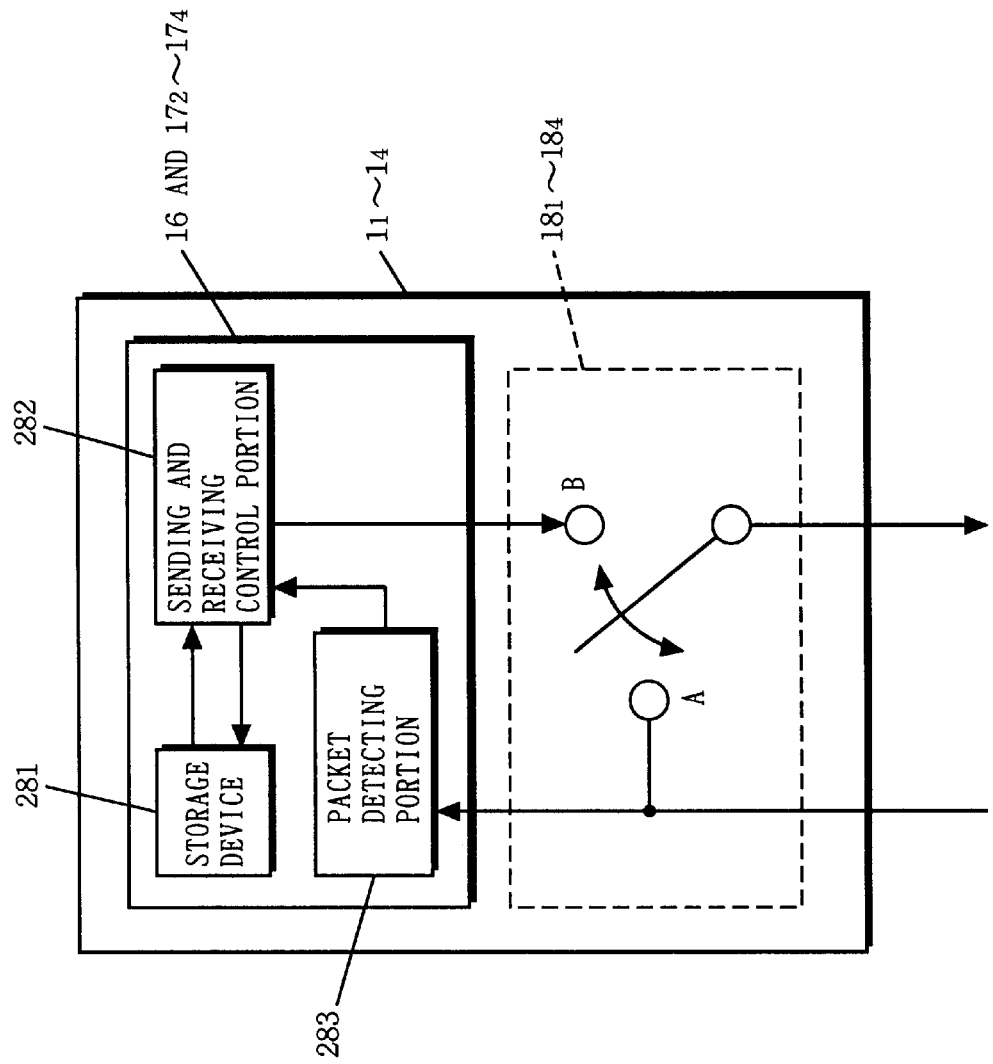
FIG. 28 is a block diagram showing the structures of a token packet sending/analysis executing device 16 and a switch $18_1$ in a master station $1_1$ shown in FIG. 19 and the structures of analysis executing devices $17_2$ to $17_4$ and switches $18_2$ to $18_4$ in slave stations $1_2$ to $1_4$ shown in FIG. 19.
Figure 29:
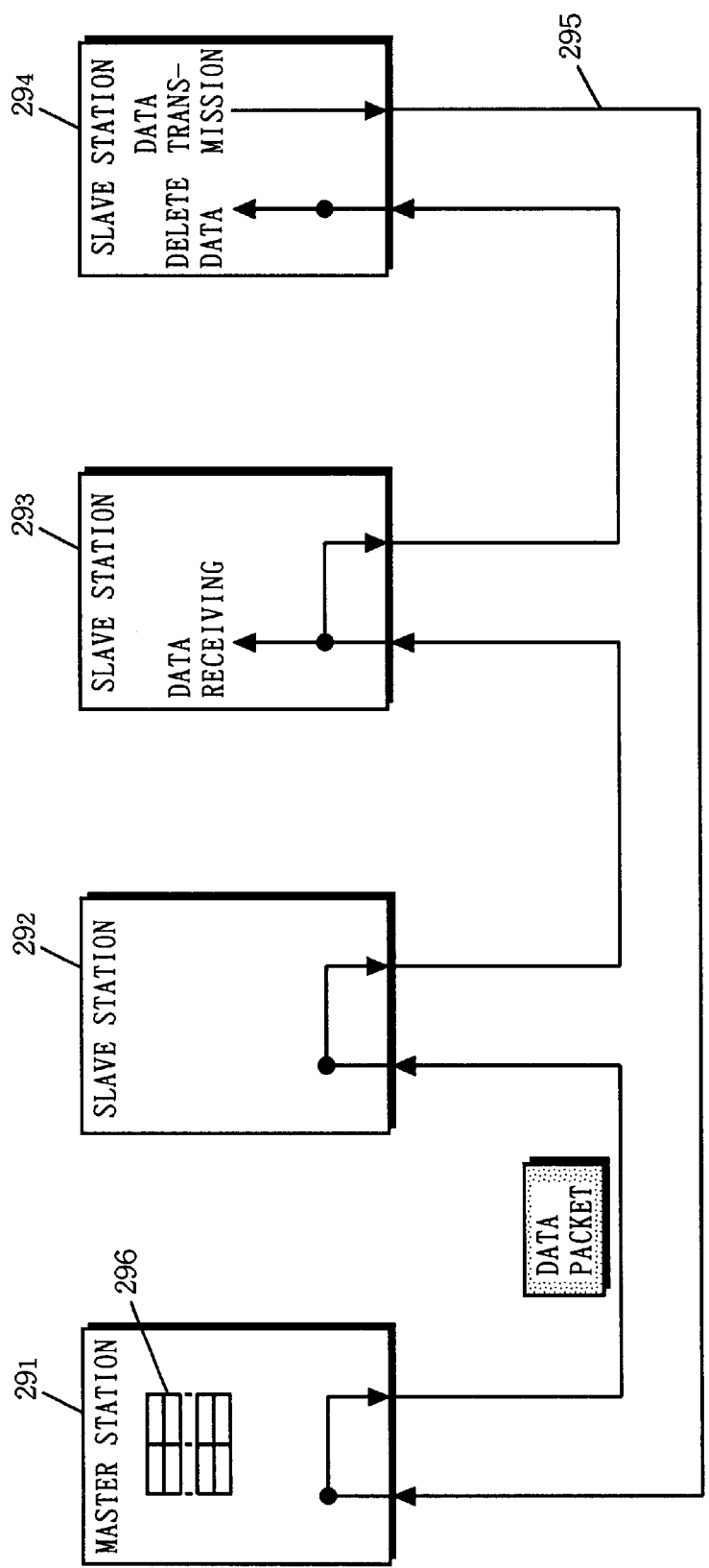
FIG. 29 illustrates the structure of a conventional communication network.

FIG. 28 is a block diagram showing the structures of the token packet sending/analysis executing device 16 and the switch $18_1$ in the master station $1_1$ shown in FIG. 19 and the structures of the analysis executing devices $17_2$ and $17_4$ and the switches $18_2$ and $18_4$ in the slave stations $1_2$ and $1_4$ shown in FIG. 19. The token packet sending/analysis executing device 16 differs from the analysis executing devices $17_2$ to $17_4$ in that it has a function of sending out token packets. It will be previously noted that the function of sending out token packets is not illustrated in FIG. 28.

In FIG. 28, each of the token packet sending/analysis executing device 16 and the analysis executing devices $17_2$ to $17_4$ comprises a storage device 281, a sending and receiving control portion 282, and a packet detecting portion 283. Although the storage device 281 initially stores an initial ID ("0×3E"), it stores an actual ID fed by the master station $1_1$ through the above-mentioned setting of actual IDs. The packet detecting portion 283 detects a special pattern included in a token packet (a token packet for switching, for example) sent out for each predetermined time period from the master station $1_1$, and detects an actual ID setting command. The sending and receiving control portion 282 in the station receives an actual ID setting command and transmits an actual ID setting acknowledgment while a clock of the station is synchronized with a clock of the master station $1_1$ on the basis of the special pattern detected by the packet detecting portion 283. This establishes the synchronization between clocks of all the stations $1_1$ to $1_4$ and a clock of the communication network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication network in which a plurality of stations are connected by a loop-shaped transmission path, any one of the plurality of stations functioning as a master station, and capable of performing asynchronous data communication to requiring real time transfer and isochronous data communication requiring the real time transfer, wherein:

the plurality of said stations are, as required, assigned identifiers which are used in the isochronous data communication and allowed to be overlapped with each other;

said master station sends out to said transmission path a token packet for isochronous data communication in which a station to be a source of transmission of isochronous data and a plurality of stations to be recipients of the isochronous data are designated using said identifiers;

said token packet for isochronous data communication is received by each of said stations through being transmitted on said transmission path without being changed by each of the stations;

wherein each of said stations:

analyzes the identifiers in the token packet for isochronous data communication received through said transmission path;

sends out, when being designated as the source of transmission of the isochronous data, an isochronous data packet held therein to said transmission path; and receives, when being designated as the recipient of the isochronous data, the isochronous data packet sent out to said transmission path; and wherein said isochronous data packet does not include any identifier assigned to the stations to be the source and the recipients thereof.

2. The communication network according to claim 1, wherein said identifiers are assigned to the stations to be the source and the recipients performing said isochronous data communication in said asynchronous data communication.

3. The communication network according to claim 2, wherein when said isochronous data packet transmitted by said station designated as the source is received by said plurality of stations designated as the recipients in said isochronous data communication, only one station among said plurality of stations to be the recipients sends out, to said transmission path, a response signal for controlling the transmission of said isochronous data packet by said station to be the source and/or notifying the acknowledgment of said isochronous data communication by the plurality of stations to be the recipients.

4. The communication network according to claim 3, wherein said only one station is designated by said asynchronous data communication.

5. The communication network according to claim 2, wherein when said isochronous data packet transmitted by said station to be the source is received by said plurality of stations to be the recipients in said isochronous data communication:

said plurality of stations to be the recipients respectively send out, to said transmission path, response signals for controlling the transmission of said isochronous data packet by said station to be the source and/or notifying the acknowledgment of said isochronous data communication by the plurality of stations to be the recipients; and said station to be the source receives only the response signal sent out by only one station among said plurality of stations to be recipients.

6. A communication network in which a plurality of stations are connected by a loop-shaped transmission path, any one of the plurality of stations functioning as a master station, and capable of performing asynchronous data communication not requiring real time transfer and isochronous data communication requiring the real time transfer, wherein:

the plurality of said stations are assigned actual IDs which are used in said asynchronous data communication and not overlapped with each other;

said master station sends out to said transmission path an inquiry token packet for inquiring whether each of said stations has a communication request of said asynchronous data;

said inquiry token packet is received by each of said stations through being transmitted on said transmission path without being changed by each of the stations;

each of said stations sends out, provided that it holds said asynchronous data and the actual ID of a station to be a recipient of the asynchronous data when receiving said inquiry token packet transmitted through said transmission path, the communication request of said asynchronous data and the actual ID of the station to be the recipient of the asynchronous data to said transmission path using a slot previously assigned thereto;

said master station sends out to said transmission path a token packet for said asynchronous data communication in which a station to be a source of transmission of the asynchronous data and the station to be the recipient of the asynchronous data are designated using said actual IDs on the basis of the communication request of said asynchronous data and the actual ID of the station to be the recipient of the asynchronous data received through said transmission path;

said token packet for asynchronous data communication is received by each of said stations through being transmitted on said transmission path without being changed by each of the stations;

wherein each of said stations:

analyzes the token packet for asynchronous data communication received through said transmission path;

sends out, when being designated as the source of transmission of the asynchronous data in the received token packet for asynchronous data communication, an asynchronous data packet held therein to said transmission path; and receives, when being designated as the recipient of the asynchronous data in the received token packet for asynchronous data communication, the asynchronous data packet sent out to said transmission path; and wherein said asynchronous data packet does not include the actual IDs assigned to the stations to be the source and the recipient thereof.

7. The communication network according to claim 6, wherein each of said stations further sends out the actual ID of the station which is to be the source of transmission of said asynchronous data when receiving said inquiry token packet transmitted through said transmission path.

8. The communication network according to claim 7, wherein each of said stations further sends out the amount and/or the priority of said asynchronous data when receiving said inquiry token packet transmitted through said transmission path.

9. The communication network according to claim 8, wherein said master station further sends out to said transmission path an identification signal for each of said stations to identify said slot after sending out said inquiry token packet.

10. The communication network according to claim 9, wherein:

said station to be the source sends out, provided that it is set with said asynchronous data and the actual ID of the station to be the recipient of the asynchronous data by an external equipment connected to the station to be the source when receiving said inquiry token packet transmitted through said transmission path, the communication request of said asynchronous data and the actual ID of the station to be the recipient of the asynchronous data to said transmission path using said slot; and after one asynchronous data packet from said station to be the source is received by said station to be the recipient through said transmission path, said asynchronous data and the actual ID assigned to the station to be the source of the asynchronous data are read from the station to be the recipient by the external equipment connected to the station to be the recipient.

11. The communication network according to claim 6, wherein:

each of said plurality of stations belongs to any one of a plurality of predetermined groups;

said master station sends out said inquiry token packet in which each of said groups is designated to said transmission path;

each of said stations receives said inquiry token packet transmitted through said transmission path, and sends out, provided that it holds said asynchronous data and the actual ID of the station to be the recipient of the asynchronous data when the inquiry token packet is for the group to which the station belongs, the communication request of said asynchronous data and the actual ID of the station to be the recipient to said transmission path using the slot previously assigned to each of the stations;

said master station sends out to said transmission path the token packet for asynchronous data communication in which said station to be the source and said station to be the recipient are designated using said actual IDs on the basis of the communication request of said asynchronous data and the actual ID of the station to be the recipient of the asynchronous data transmitted through said transmission path for each of said groups;

said inquiry token packet is received by each of said stations through being transmitted on said transmission path without being changed by each of the stations;

each of said stations, when received the token packet for asynchronous data communication in which the station is designated as the source of transmission after sending out the communication request of said asynchronous data, sends out the asynchronous data packet held therein to said transmission path; and said asynchronous data packet does not include the actual IDs assigned to the stations to be the source and the recipients thereof.

12. The communication network according to claim 11, wherein said master station sends out, after sending out said inquiry token packet to the certain group among said plurality of groups, said inquiry token packet to any other groups among said plurality of groups.

13. The communication network according to claim 12, wherein each of said stations further sends out the actual ID of the station which is to be the source of transmission of said asynchronous data when said inquiry token packet is received through said transmission path and when the inquiry token packet is for the group to which the station belongs.

14. The communication network according to claim 13, wherein each of said stations further sends out information representing the amount and/or the priority of said asynchronous data when said inquiry token packet is received through said transmission path and when the inquiry token packet is for the group to which the station belongs.

15. The communication network according to claim 14, wherein said master station further sends out to said transmission path an identification signal for each of said stations to identify said slot after sending out said inquiry token packet.

16. The communication network according to claim 15, wherein:

said station to be the source sends out, provided that it is set with said asynchronous data and the actual ID of the station to be the recipient of the asynchronous data by an external equipment connecting to the station to be the source when received said inquiry token packet transmitted through said transmission path, the communication request of said asynchronous data and the actual ID of the station to be the recipient of the asynchronous data to said transmission path using said slot; and after one asynchronous data packet from said station to be the source is received by said station to be the recipient through said transmission path, said asynchronous data and the actual ID assigned to the station to be the source of the asynchronous data are read from the station to be the recipient by the external equipment connected to the station to be the recipient.

17. In a communication network in which a plurality of stations are connected by a loop-shaped transmission path, any one of the plurality of stations functioning as a master station, and the stations other than the master station functioning as slave stations, and capable of performing asynchronous data communication not requiring real time transfer and isochronous data communication requiring the real time transfer, a method of setting actual IDs, in the stations, which are not overlapped with each other, wherein:

each of the slave stations is previously assigned an initial ID common at least among the slave stations;

each of the slave stations comprise a switch for switching between connection and disconnection of the transmission path;

the master station sends out to the transmission path a token packet for switching which is receivable by the slave stations having the initial IDs, and then sends out to the transmission path a plurality of actual ID setting commands for respectively setting the actual IDs which differ from each other in the slave stations;

each of the slave stations disconnects the transmission path using the switch when having the initial ID and also receiving the token packet for switching sent out by the master station so that a receiving signal is not transmitted to the station positioning on the downstream side of the slave station on the transmission path;

each of the slave stations sets therein, when having the initial ID and also receiving through the transmission path the actual ID setting command sent out by the master station, the actual ID on the basis of the received actual ID setting command;

each of the slave stations connects the transmission path using the switch when the actual ID is set therein so that the subsequent actual ID setting command coming through the transmission path from the master station is transmitted to the station positioning on the downstream side of the slave station on the transmission path;

the actual IDs are thus successively set in the slave stations, starting from the slave station positioning on the downstream side of the master station and nearest thereto;

the master station sends out to the transmission path a token packet including the actual IDs of the stations to be a source of transmission of data and a recipient thereof in the isochronous data communication or the asynchronous data communication;

the token packet is received by each of the slave stations and the master station through being transmitted on the transmission path without being changed by each of the slave stations; and each of the slave stations and the master station:
analyze the actual ID of the token packet received through the transmission path;
send out, when being designated as the source of transmission of the data in the analyzed token packet, a data packet held thereby to the transmission path; and
receives, when being designated as the recipient of the data, the data packet sent out to the transmission path; and
wherein the data packet does not include the actual IDs assigned to the stations to be the source and the recipients thereof.

18. The method according to claim 17, wherein each of the slave stations transmits, after the actual ID is set therein, an actual ID setting acknowledgment indicating that the actual ID is set to the master station.

19. The method according to claim 18, wherein each of the stations synchronizes an internal clock with a clock of the master station by receiving the token packet for switching sent out by the master station for each predetermined time period and transmitted through the transmission path.

20. The method according to claim 19, wherein each of the stations synchronizes an internal clock with a clock of the master station by receiving the token packet for switching sent out by the master station for each predetermined time period and transmitted through the transmission path.

* * * * *